US011921409B2

(12) United States Patent
Isabelle et al.

(10) Patent No.: US 11,921,409 B2
(45) Date of Patent: Mar. 5, 2024

(54) LASER PROJECTOR SYSTEM

(71) Applicant: FARO Technologies, Inc., Lake Mary, FL (US)

(72) Inventors: Maxime Isabelle, Montreal (CA); Matthew T. Armstrong, Glenmoore, PA (US); Salvatore DiAngelus, Glen Mills, PA (US); Leonardo Martinez, Berwyn, PA (US); Joel H. Stave, New Boston, NH (US)

(73) Assignee: FARO Technologies, Inc., Lake Mary, FL (US)

( * ) Notice: Subject to any disclaimer, the term of this patent is extended or adjusted under 35 U.S.C. 154(b) by 221 days.

(21) Appl. No.: 17/358,511

(22) Filed: Jun. 25, 2021

(65) Prior Publication Data

US 2022/0326593 A1 Oct. 13, 2022

Related U.S. Application Data

(60) Provisional application No. 63/174,151, filed on Apr. 13, 2021.

(51) Int. Cl.
*G03B 21/20* (2006.01)
*G01B 11/00* (2006.01)
*G01B 11/25* (2006.01)

(52) U.S. Cl.
CPC ........ *G03B 21/2033* (2013.01); *G01B 11/002* (2013.01); *G01B 11/2513* (2013.01)

(58) Field of Classification Search
None
See application file for complete search history.

(56) References Cited

U.S. PATENT DOCUMENTS

| 5,381,258 | A | * | 1/1995 | Bordignon | G06K 7/10831 |
| | | | | | 348/202 |
| 8,582,087 | B2 | | 11/2013 | Kaufman et al. | |
| 9,826,207 | B2 | | 11/2017 | Kaufman et al. | |
| 9,879,983 | B2 | | 1/2018 | Kaufman et al. | |
| 10,408,606 | B1 | | 9/2019 | Raab et al. | |
| 10,663,292 | B2 | | 5/2020 | Raab et al. | |
| 10,670,390 | B2 | | 6/2020 | Wilson et al. | |
| 10,884,257 | B2 | | 1/2021 | Savikovsky et al. | |
| 2006/0170870 | A1 | * | 8/2006 | Kaufman | G03B 21/00 |
| | | | | | 353/28 |

(Continued)

OTHER PUBLICATIONS

International Search Report and Written Opinion; dated Jul. 20, 2022; Application No. PCT/US2022/023279; Filed: Apr. 4, 2022; 13 pages.

(Continued)

*Primary Examiner* — Bao-Luan Q Le
*Assistant Examiner* — Danell L Owens
(74) *Attorney, Agent, or Firm* — McCarter & English, LLP; Dave S. Christensen

(57) ABSTRACT

A light projector and method of aligning the light projector is provided. A light projector steers an outgoing beam of light onto an object, passing light returned from the object through a focusing lens onto an optical detector. The light projector may generate a light pattern or template by rapidly moving the outgoing beam of light along a path on a surface. To place the light pattern/template in a desired location, the light projector may be aligned with an electronic model.

17 Claims, 18 Drawing Sheets

(56) References Cited

U.S. PATENT DOCUMENTS

| | | |
|---|---|---|
| 2008/0246943 A1 | 10/2008 | Kaufman et al. |
| 2016/0343125 A1 | 11/2016 | Keitler et al. |
| 2021/0124166 A1 | 4/2021 | Candiloro et al. |
| 2021/0126419 A1 | 4/2021 | Savikovsky et al. |
| 2021/0254970 A1 | 8/2021 | Isabelle et al. |
| 2022/0128671 A1 | 4/2022 | Parian et al. |
| 2022/0130112 A1 | 4/2022 | Ossig et al. |
| 2022/0137225 A1 | 5/2022 | Parian et al. |

OTHER PUBLICATIONS

International Preliminary Report on Patentability for Application No. PCT/US2022/023279, dated Oct. 26, 2023, 9 pages.

\* cited by examiner

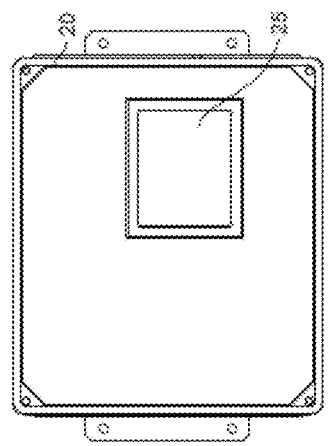
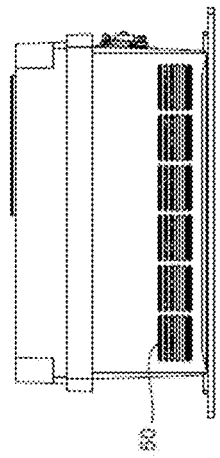
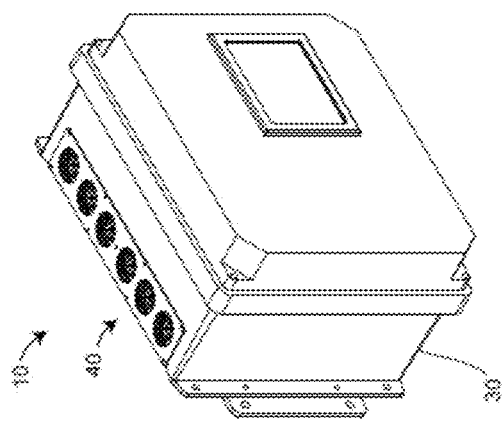

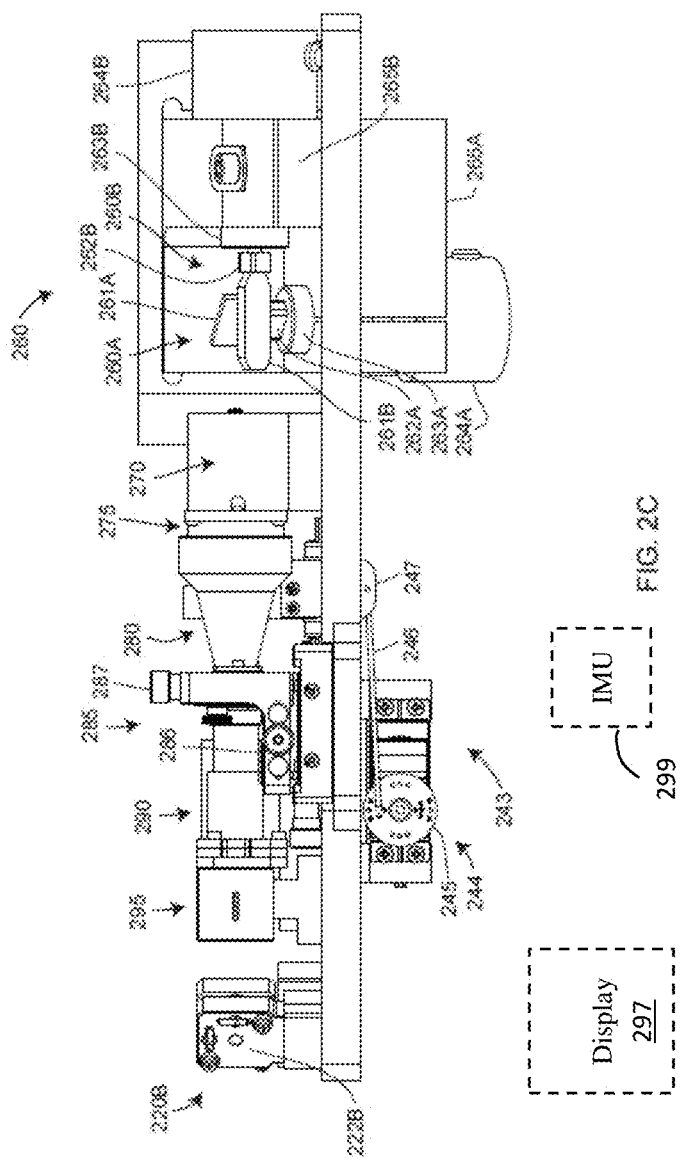

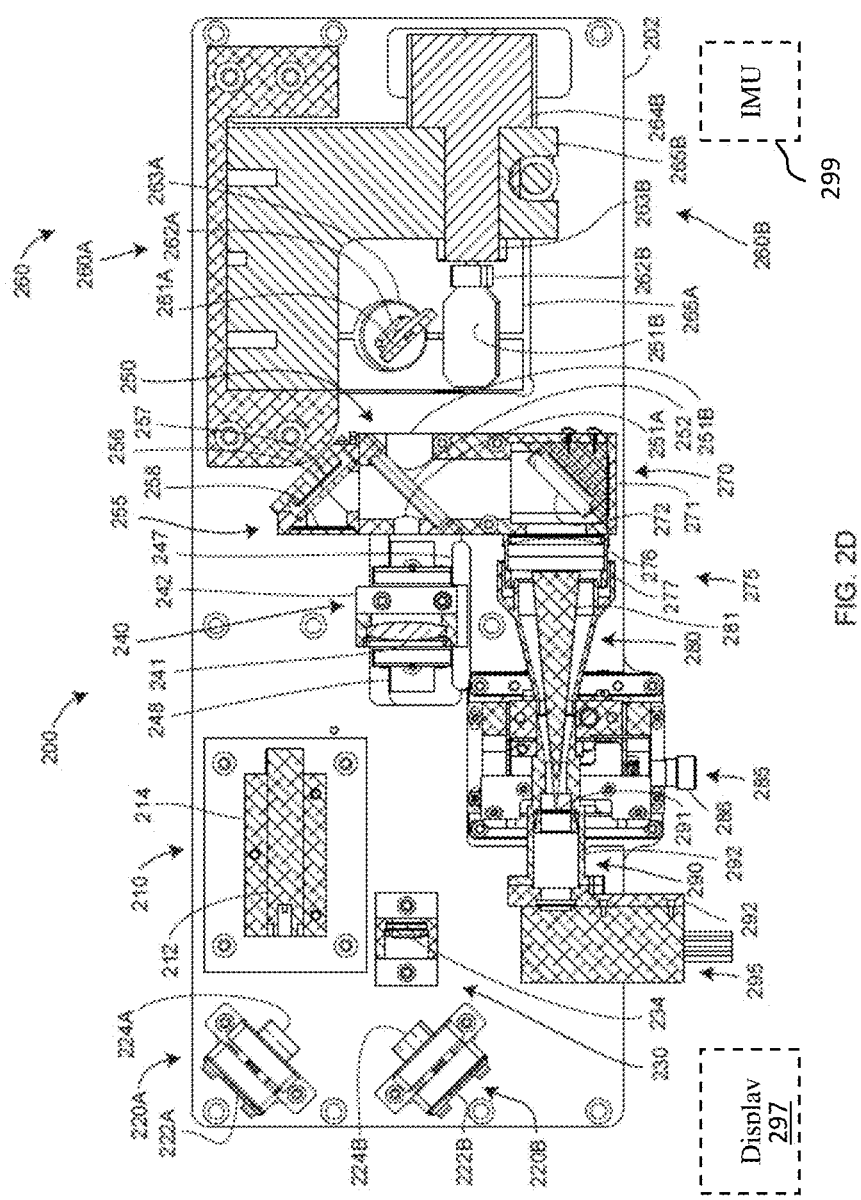

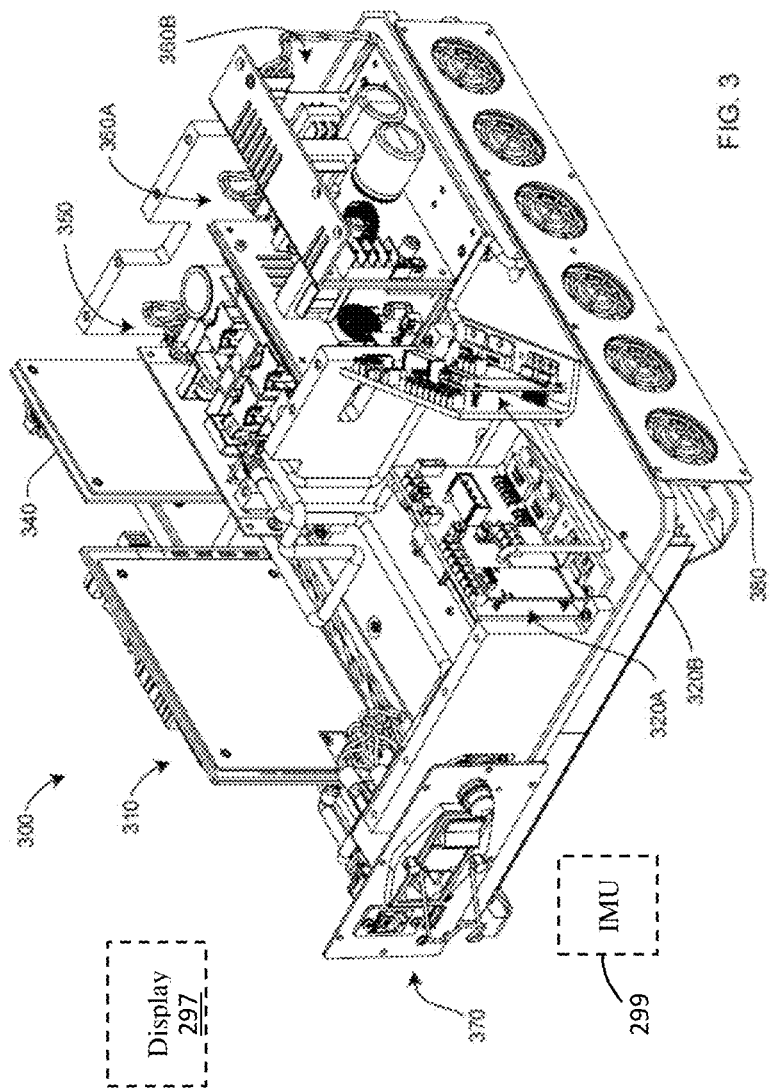

LASER PROJECTOR SYSTEM

CROSS REFERENCE TO RELATED APPLICATIONS

This application claims the benefit of U.S. Provisional Application Ser. No. 63/174,151, filed Apr. 13, 2021, the entire disclosure of which is incorporated herein by reference.

BACKGROUND

The subject matter disclosed herein relates to a light projection system, often referred to as a "laser projection system" or "laser projector," and in particular to a light projection system that projects a glowing light pattern onto an object.

Light projection devices are used in a variety of applications to project images onto objects. In some applications, an illuminated three-dimensional (3D) pattern, also referred to as a "template," is projected onto an object. The template may be formed, for example, by projecting a rapidly moving, vector-scan, light beam onto the object. In some systems, the projected light beam is a laser beam. The light beam strikes the surface of the object following a predetermined trajectory in a repetitive manner. When repetitively moved at a sufficiently high beam speed and refresh rate, the trace of the projected beam on the object appears to the human eye as a continuous glowing line. The projected pattern of light appears as the glowing template that can be used to assist in the positioning of parts, components, and work pieces. In some cases, the projected template is based partly on computer aided design (CAD) data of the object.

A challenge faced by light projection devices is in aligning the light projection system to the environment in which it is located so that the template is positioned in the desired location and orientation. Accordingly, while existing systems and methods of patterned light projection are suitable for their intended purposes, the need for improvement remains, particularly in providing a light projection system having the features described herein.

BRIEF DESCRIPTION

According to one aspect of the disclosure, a method of aligning a light projector and an electronic model in an environment is provided.

According to one or more embodiments, a method of aligning a light projector and an electronic model in an environment includes placing the light projector in the environment, and projecting a visible scan-box to mark a portion of the environment to be captured in an intensity image by the light projector. The method further includes acquiring the intensity image of the portion of the environment at a predetermined scan resolution. The method further includes identifying a plurality of point targets in the environment in the intensity image. The method further includes associating the plurality of point targets with a plurality of points in the electronic model. The method further includes aligning the light projector to the electronic model based at least in part on the plurality of point targets and the plurality of points.

In one or more embodiments, the intensity image is acquired by performing multiple intensity scans to refine locations of the point target.

Associating the plurality of point targets with the plurality of points includes automatically detecting with a processor the point targets in the intensity image.

In one or more embodiments, the method further includes checking on a periodic or aperiodic basis for drift, wherein the checking for drift includes placing at least one point target in the environment and acquiring a second intensity image of the at least one point target. Checking for drift can include identifying the at least one point target in the second intensity image and comparing a position of the at least one point target in the second intensity image with an expected position of the at least one point target.

Checking for drift can further include realigning the light projector and electronic model when a deviation between the position of the at least one point target in the second intensity image and the expected position exceeds a threshold.

In one or more embodiments, the method further includes measuring an angle rotation of the light projector with at least one sensor, and realigning the light projector to the electronic model based at least in part on the measured angle of rotation.

In one or more embodiments, the method further includes scanning the environment with a laser scanner to obtain a plurality of three-dimensional coordinates in the environment, a portion of the plurality of three-dimensional coordinates being on a surface. The method further includes extracting the surface from the plurality of three-dimensional coordinates. The method further includes generating at least two topographical curves based on a flatness of the surface. The method further includes projecting a light pattern on the surface with the light projector based at least in part on the at least two topographical curves.

In one or more embodiments, the method further includes placing the plurality of point targets in the environment prior to scanning with the laser scanner, the plurality of point targets being within a field of view of the laser scanner and located in the intensity image.

In one or more embodiments, the method further includes projecting a glowing pattern of light onto the portion of the environment.

According to one or more embodiments, a system includes a light projector having a light source, a beam-steering system operable to direct a beam of outgoing light onto a surface, the light projector further having an optical detector configured to receive at least a portion of a light beam reflected off of the surface. The system also includes one or more processors that are operable to execute computer instructions to perform a method. The method includes projecting a visible scan-box to mark a portion of an environment in which the light projector is placed, wherein the portion of the environment is captured in an intensity image by the light projector. The method further includes acquiring the intensity image of the portion of the environment at a predetermined scan resolution. The method further includes identifying a plurality of point targets in the environment in the intensity image. The method further includes associating the plurality of point targets with a plurality of points in an electronic model including a representation of the portion of the environment. The method further includes aligning the light projector to the electronic model based at least in part on the plurality of point targets and the plurality of points.

According to one or more embodiments, a computer program product includes a memory device with computer executable instructions stored thereon, the computer executable instructions when executed by one or more processors causes the one or more processors to perform a method. The method includes projecting a visible scan-box to mark a portion of an environment in which the light projector is placed, wherein the portion of the environment is captured in an intensity image by the light projector. The method further includes acquiring the intensity image of the portion of the environment at a predetermined scan resolution. The method further includes identifying a plurality of point targets in the environment in the intensity image. The method further includes associating the plurality of point targets with a plurality of points in an electronic model including a representation of the portion of the environment. The method further includes aligning the light projector to the electronic model based at least in part on the plurality of point targets and the plurality of points.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

FIGS. 1A, 1B, 1C are perspective, front, and bottom views, respectively, of a light projector according to an embodiment;

FIG. 2A, FIG. 2B, and FIG. 2C are perspective, top, and side views, respectively, of optical and electro-optical elements of the light projector according to an embodiment;

FIG. 2D is a cross-sectional view of an optical and electro-optical elements of the light projector according to an embodiment;

FIG. 3 is a perspective view of electrical components within the light projector according to an embodiment;

The detailed description explains embodiments of the disclosure, together with advantages and features, by way of example with reference to the drawings.

DETAILED DESCRIPTION

Technical solutions described herein provide improved operations of a light projector by automatically or semi-automatically aligning a light projector to an environment. Additionally, technical solutions described herein facilitate automatically or semi-automatically checking the light projector for drift or changes in alignment. Further, technical solutions described herein facilitate realigning the light projector with the environment in response to the light projector being moved or rotated. Further yet, technical solutions described herein provide for an alignment of the light projector and the projection of topographical lines on a surface in the environment.

Figure 1D:
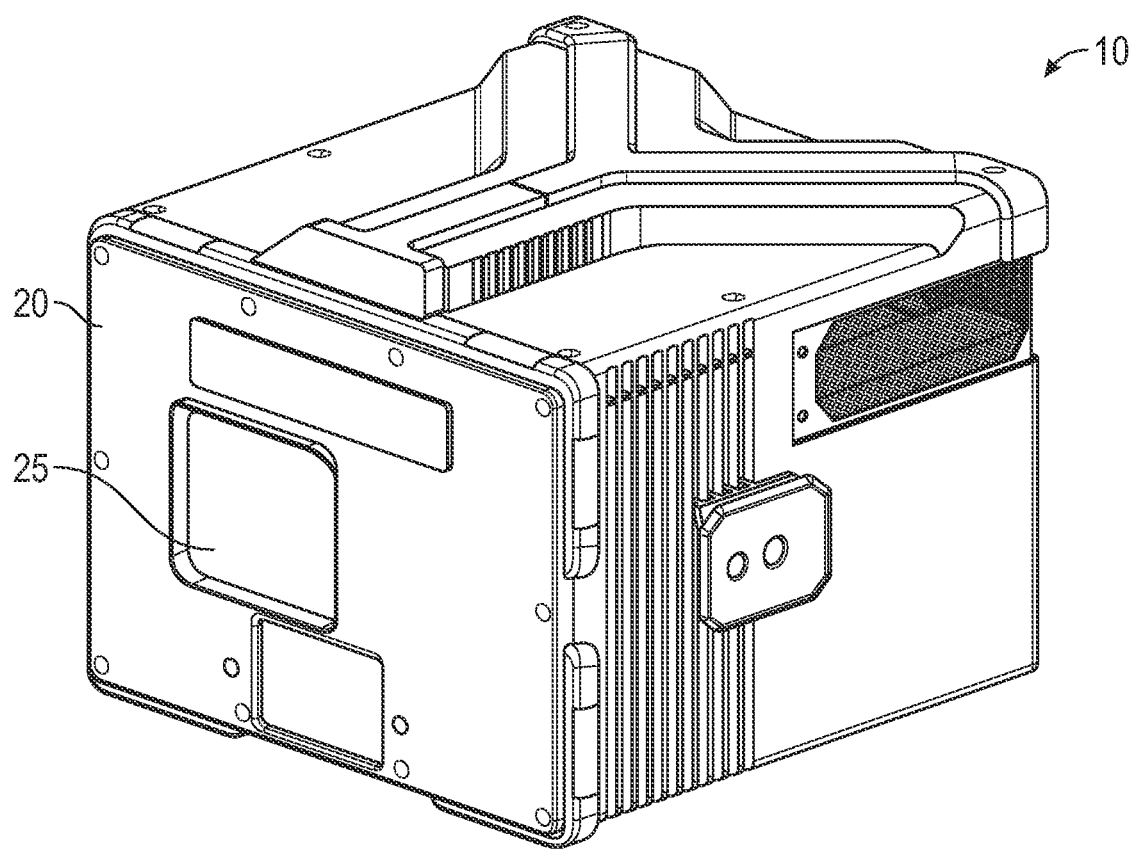
FIG. 1D is a perspective view of the light projector in accordance with another embodiment.
Figure 2A:
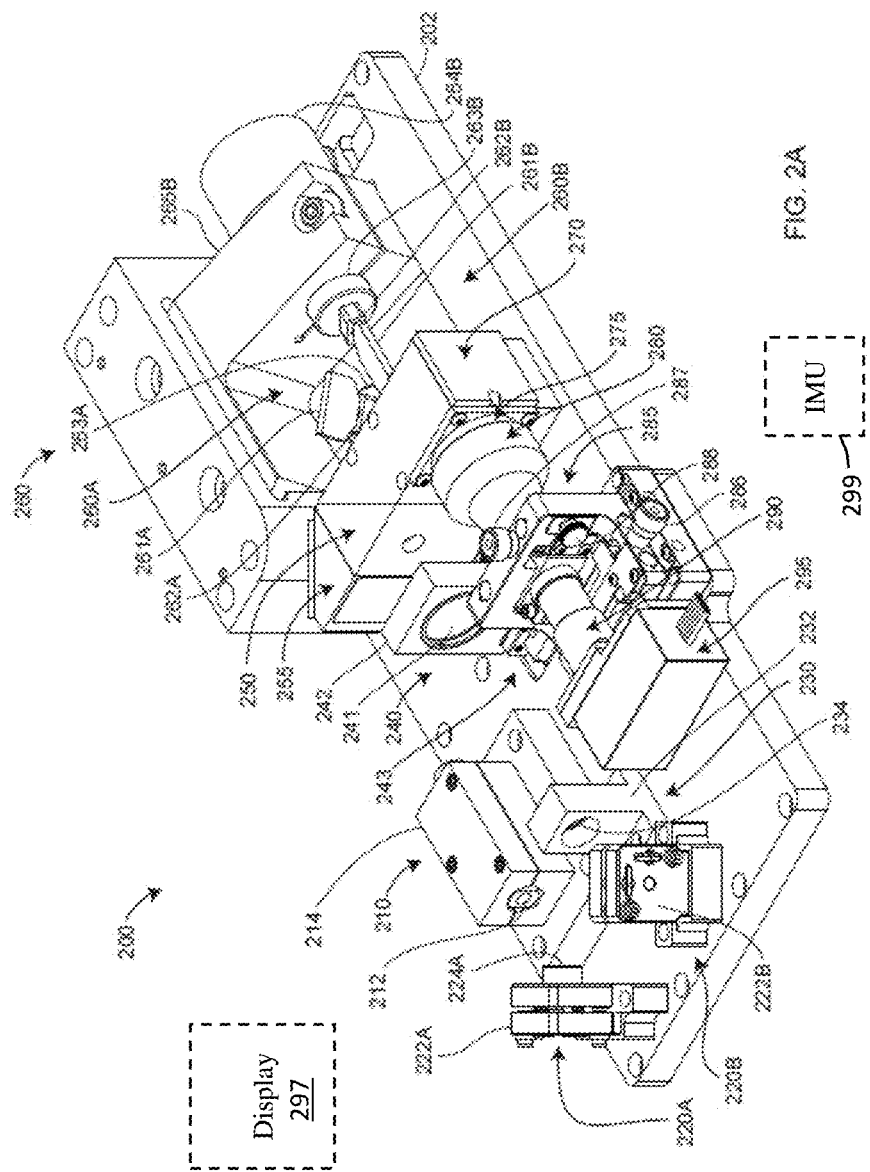
Figure 2B:
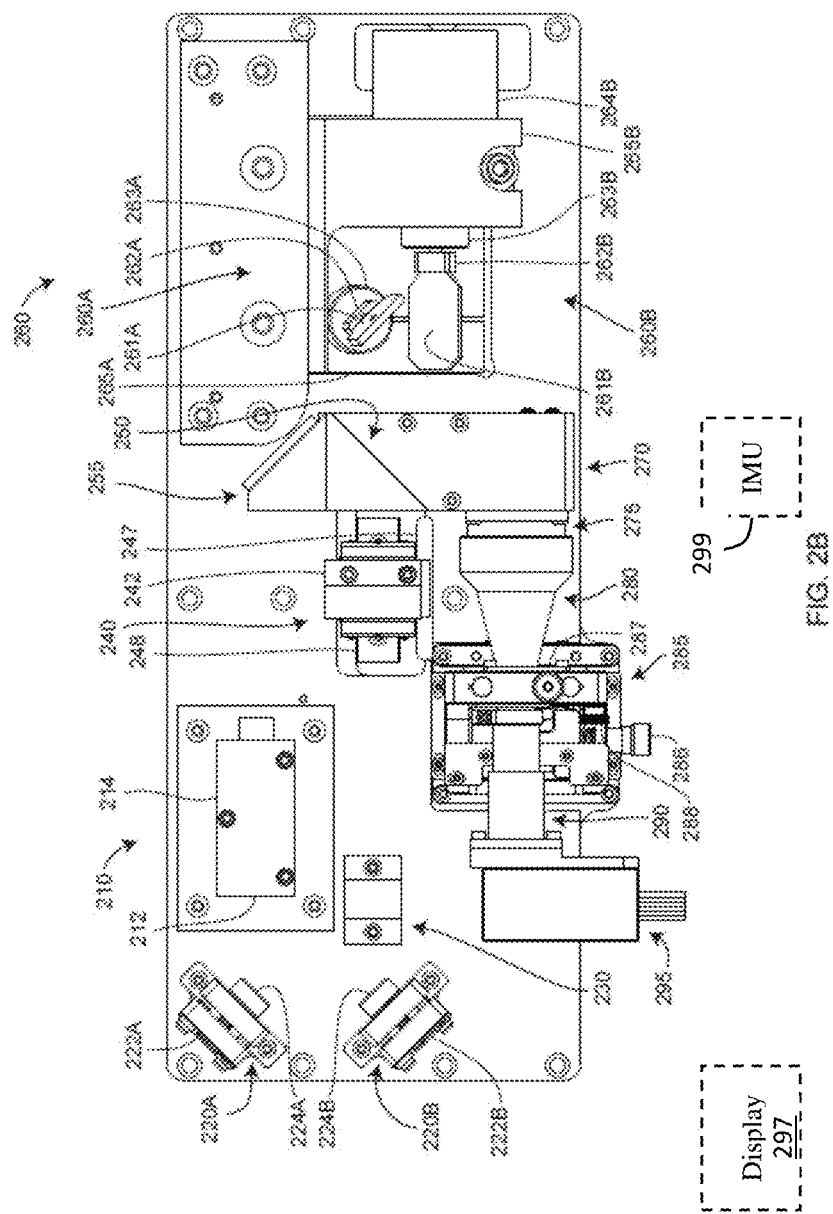

FIGS. 1A, 1B, 1C are perspective, front, and bottom views of a light projector 10 according to an embodiment. In an embodiment, the light projector 10 includes a front cover 20, a window 25, a base housing 30, a fan assembly 40, and venting slots 50. In an embodiment, a beam of light is sent out of and returned back through the window 25.

FIGS. 2A, 2B, 2C, 2D are perspective, top, side, and cross-sectional views, respectively, of an electro-optical plate assembly 200 within the light projector 10. In an embodiment, the light projector 10 includes a mounting plate 202, a light source assembly 210, fold mirror assemblies, 220A, 220B, expanding lens assembly 230, collimating/focusing lens assembly 240, beamsplitter assembly 250, two-axis beam-steering assembly 260, reflector mirror assembly 270, and focusing lens assembly 275.

In an embodiment, the light source assembly 210 includes a light source 212 and a mounting block 214. In an embodiment, the light source 212 is a diode-pumped solid state laser (DPSS) that emits a round beam of green laser light having a wavelength of about 532 nm. In other embodiments, the light source 212 is a different type of laser such as a diode laser or is a non-laser source. In an embodiment, the fold mirror assemblies 220A, 220B include fold mirrors 224A, 224B, respectively, and adjustable mirror mounts 222A, 222B, respectively. In an embodiment, light from the light source reflects off the fold mirrors 224A, 224B and then travels through a beam expander 230, which includes a beam expander lens 234 and a beam expander mount 232. The expanded beam of light from the beam expander 230 travels through a collimating/focusing lens assembly 240, which acts to focus the beam leaving the light projector 10 onto an object of interest. Because the light leaving the light projector 10 is relatively far from the light projector 10, the beam of light is nearly collimated and converges relatively slowly to a focused spot. In an embodiment, the collimating/focusing lens assembly 240 includes a lens 241, a lens mount 242, and a motorized focusing stage 243. The motorized focusing stage 243 adjusts the position of the lens 241 and lens mount 242 to focus the beam of light onto the object of interest. In an embodiment, the motorized focusing stage 243 includes a servomotor assembly 244 that drives a rotary actuator 245 attached to shaft 246 affixed to an attachment 247. As the rotary actuator 245 rotates, it causes the lens mount 242 to be translated on a ball slide 248.

In an embodiment, the beamsplitter assembly 250 includes entrance aperture 251A, exit aperture 251B, and beamsplitter 252. In an embodiment, the beamsplitter 252 is a 50/50 beamsplitter, which is to say that the beamsplitter 252 transmits half and reflects half the incident optical power. Half of the light arriving at the beamsplitter assembly 250 from the collimating/focusing lens assembly 240 is reflected onto a beam absorber assembly 255, which absorbs almost all the light, thereby preventing unwanted reflected light from passing back into the electro-optical plate assembly 200. In an embodiment, the beam absorber assembly 255 includes a neutral density filter 256, a felt absorber 257, and a felt absorber 258.

Figure 4:
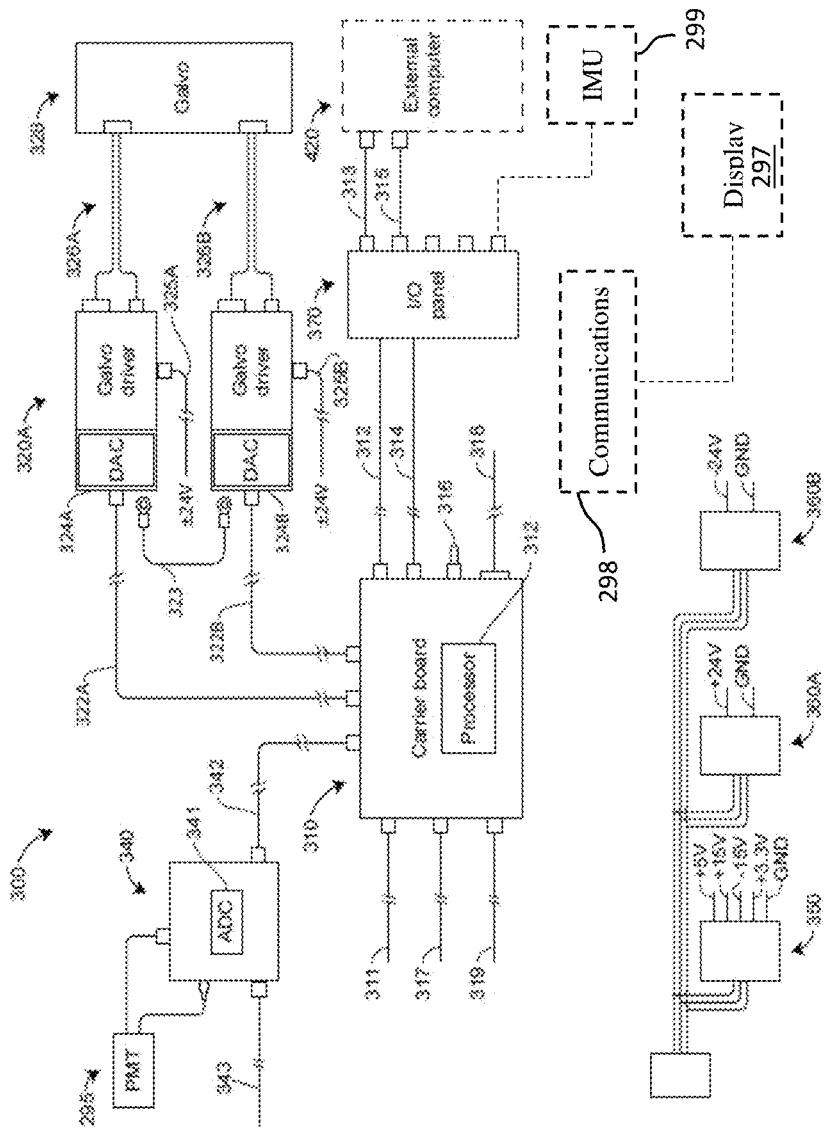
FIG. 4 is an electrical block diagram of the light projector according to an embodiment.

The two-axis beam-steering assembly 260 includes beam steering assemblies 260A, 260B. Each beam steering assembly 260A, 260B includes respectively a lightweight mirror 261A, 261B, a mirror mount 262A, 262B, a motor 263A, 263B, a position detector 264A, 264B, and a mounting block 265A, 265B. The first mirror 261A steers the beam of light to the second mirror 261B, which steers the beam out of the window 25 to the object of interest. The beam-steering assembly 260 steers the beam in each of two orthogonal axes, sometimes referred to as x-y axes. In an embodiment, the beam-steering assembly 260 is provided steering directions to move the beam of light in a predetermined pattern by a processor 312 (FIG. 4). Light reflected or scattered off the object of interest retraces the outgoing path, striking first the mirror 261B and then the mirror 261A before passing through the exit aperture 251B, and reflecting off the beamsplitter 252. Beam steering assemblies such as 260A, 260B are also each referred to as galvanometers or galvos, which is an electromechanical device that works as an actuator that produces a rotary deflection, in this case of the mirrors 261A, 261B.

The mirror assembly 270 includes mount 271 and return mirror 272. The focusing mirror assembly 275 includes focusing lens 276 and lens mount 277. In an embodiment, light arriving at the return mirror 272 from the beamsplitter 252 passes through the focusing lens 276. In an embodiment, the focusing lens 276 is a doublet. In an embodiment, an opaque cone 280 smoothly slides over lens mount 277 and attaches rigidly to adjustment stage 285. The purpose of the opaque cone 280 is to block background light from within the light projector 10 from contaminating the light emitted by the light source 210 and reflected off the object of interest and passing through the lens 276. Aperture assembly includes aperture 291 and aperture mount 292. In an embodiment, the aperture assembly 290 is rigidly affixed to the optical detector assembly 295 by an interface element 292. In an embodiment, the aperture assembly 290 is further rigidly coupled to the adjustment stage 285. The adjustment stage 285 is adjusted in the x direction by an x adjuster 286, in the y direction by ay adjuster 287, and in the z direction by a z adjuster 288. The purpose of the adjustment stage 285 is to adjust the position of the aperture 291 and the optical detector assembly 295 in x, y, and z relative to the beam of light to enable the focused beam of light 281 to pass through the aperture for the object of interest located within the rated range of distances of the object being scanned with the light from the light projector 10. The purpose of the aperture is to block unwanted background light, especially light scattered from within the enclosure of the laser projector 10, for example, off the mirrors 216A, 216B, the beamsplitter 252, the components of the beam block 255, the return mirror 272, and the focusing lens 276. In addition, the aperture 291 helps to block unwanted background light from the environment outside the enclosure of the light projector 10. Examples of such unwanted background light blocked by the aperture include artificial light and sunlight, both direct and reflected.

In an embodiment, the aperture 291 is a circular aperture. In an embodiment, the circular aperture has a diameter of 150 micrometers and a centering accuracy of +/−20 micrometers. A circular aperture is often referred to as a pinhole, and the element 291 may alternatively be referred to as an aperture or a pinhole. In other embodiments, the aperture is not circular but has another shape.

The optical detector assembly 295 receives light on an optical detector within the assembly 295 and produces an electrical signal in response. In an embodiment, the optical detector is a photomultiplier tube (PMT). In an embodiment, the PMT includes a high-voltage supply circuit and a low-noise amplifier. In an embodiment, the amplifier is connected close to the PMT anode output pin to reduce the effect of external noise on the produced electrical signal. In an embodiment, the PMT is a Hamamatsu H11903 photosensor manufactured by Hamamatsu Photonics K.K., with headquarters in Shimokanzo, Japan. An advantage of a PMT for the present application includes high sensitivity to small optical powers and ability to measure both very weak optical signals and very strong optical signals. In an embodiment, the gain of the PMT can be adjusted by a factor of 100,000 or more according to the selected gain level, which is determined by the voltage applied to the PMT. This wide range of achievable gains enables the light projector to measure object regions ranging from dark black to bright white or shiny (i.e. highly reflective).

As explained herein above, the motorized focusing stage 243 adjusts the position of the lens 241 and lens mount 242 to focus the beam of light from the light projector 10 onto the object of interest. In an embodiment, the motorized focusing stage 243 adjusts the position of the collimating/focusing lens assembly 240 to each of several positions, thereby producing scanning lines of different widths. In an embodiment, the desired focusing of the collimating/focusing lens assembly 240 is found by stepping the lens 241 to each of several positions. At each of those positions, the galvo mirrors 261A, 261B are used to steer the projected light along a line. Without being bound to a particular theory, it is believed the reason for this change in relative optical power level is speckle, which is an effect in which laser light scattered off different portions of an object interfere constructively or destructively to produce the fluctuations in returned optical power. When a laser beam is focused, the relative change in the returned optical power is increased as the beam is swept along the object. In an embodiment, the motorized focusing stage 243 is adjusted until the maximum change in relative optical power is achieved in scanning a line. This ensures that the lens 241 has been adjusted to the position of optimal focus.

Figure 5A:
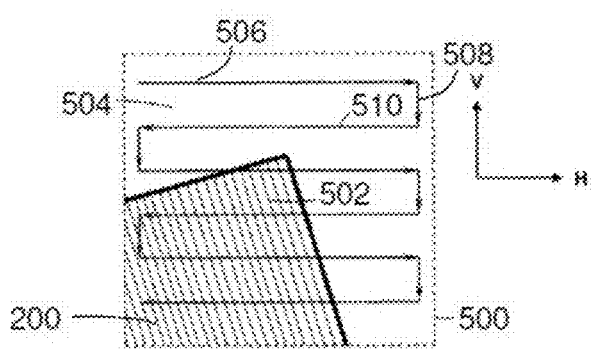
FIG. 5A is a diagram illustrating a path of the laser beam emitted from the system of FIG. 1 forming a scan pattern in accordance with an embodiment.

In an embodiment, a pre-scan is performed to determine the desired level of gain for a given scan region (FIG. 5A). For example, if a region is scanned with some elements in the region having a relatively high reflectance, for example because the elements are white, the gain of the PMT is set to a relatively low value since the optical power returned to the PMT is relatively high. On the other hand, if scanning is performed on a region containing only elements having relatively low reflectance, for example because the elements are black or dark, the gain of the PMT is set to a relatively high value. In an embodiment, a pre-scan is performed on a region to be measured as a way to obtain relatively high measurement sensitivity without saturating the PMT. In other words, the use of a pre-scan enables relatively dark objects to be measured even at relatively large distances from the light projector 10. When a region includes both white or light objects as well as black or dark objects, in an embodiment, the region may be broken into sub-regions, with separate scans performed for at least some of the sub-regions.

In an embodiment shown in FIG. 5A, the light projector 10 performs an initial scan of an area 500 around an object or surface 502 in the environment. The light beam is steered via galvanometers 260A, 260B and mirrors 261A, 261B at a constant velocity and varying azimuth angle H along a pattern 504. The pattern 504 begins along trace line 506. At the end of line 506, the mirror 261A stops and the mirror 261B steers the beam to vary the elevation of the signal light beam along line 508. The mirror 261B then stops and the mirror 261A steers the signal light beam along retrace line 510. This scan process continues in this bi-directional manner to cover the area 500. It should be appreciated that during each trace and retrace, the galvanometer 403 is driven by a stream of digital command signals from processor 312 via a galvo driver 301A, 320B. In an embodiment, the command signals are transmitted at substantially equal time increments as defined by the master clock. At each time increment, processor 312 processes the output of an ADC to determine the pulse amplitude for the object feedback signal that corresponds to the feedback light intensity. In an embodiment, the processor 312 constructs a two-dimensional image array comprised of a series of rows. Each row representing a digitized signal intensity along the trace or retrace line.

In an embodiment, after the completion of the preliminary scan, the processor 312 analyzes a captured digital intensity image (based at least in part of the image array) and determines the high or maximum value of the image array. That value corresponds to a large or maximum amplitude of the amplified feedback signal pulses. Based on the result, the processor may determine adequate levels of controls that could be used for the next detailed object scan to keep the pulse signals amplitudes within an acceptable signal range for the photodetector assembly 295. It should be appreciated that multiple successive preliminary scans could be performed to establish proper levels of controls for the photodetector assembly 295.

Figure 5B:
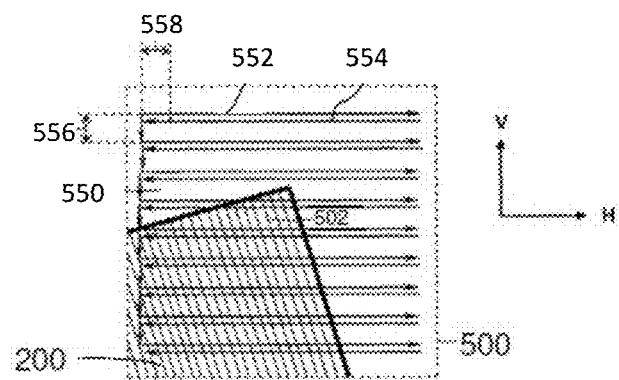
FIG. 5B is a diagram illustrating another path of the laser beam emitted from the light projector of FIG. 1 forming a scan pattern in accordance with an embodiment.

The detailed object/surface scan that is being performed after one or more preliminary scans is illustrated in FIG. 5B. It shows a scan trajectory that follows a bi-directional scan pattern 550. In contrast to the preliminary scan, in an embodiment, the final scan includes a trace 552 and a retrace 554 that are superimposed or collinear. It should be appreciated that lines 552, 554 are illustrated slightly separated in FIG. 5B for clarity purposes only. The processor 312 then proceeds to perform the scan line by line, as described herein with respect to the preliminary scan, with the trace and retrace lines being separated by a vertical segment 556. In an embodiment, the trace and retrace line segment 556 (V pixel size) and the sampling interval 558 (H pixel size) are each typically between 30 to 50 micro radians. In an embodiment, the resolution is user definable.

In an embodiment, an array of pixel data is being constructed by the processor 312 as the result of the detailed object scan. Each element of the array is associated with the H and V pixel locations and contains the values of the feedback light intensity and the time-of-flight represented as the time delay between the reference signal pulse and the feedback signal pulse. The light intensity values are utilized to construct a pixelized two-dimensional intensity image for object feature detection. This feature detection may be the same as that described in U.S. Pat. No. 8,582,087, the contents of which are incorporated herein by reference. The time-of-flight represented as the time delay is used to calculate the distance between the system 10 and the pixel point by multiplying the value of time delay by the speed of light in air. The time delay is determined as being the difference between the timing locations of the reference signal waveform and the feedback signal waveform with respect to the train of sampling pulses generated by sampling clock. An exemplary method of extracting the timing location of the pulse waveform independently from the pulse's amplitude is described in Merrill Scolnik, "Introduction to Radar Systems", McGraw-Hill, International Editions, 2002, the contents of which are incorporated herein by reference.

In an embodiment, the light from the light source 212 that leaves the light projector 10 travels to the object of interest and scatters off the object in a solid angle, afterwards retracing its path as it returns to the light projector 10. After reflecting off the mirrors 261B, 261A, the solid angle of returning scattered light is limited in size by the exit aperture 251B. The light then reflects off beamsplitter 252 before passing through the lens 276 to form the focused light beam 281. The direction of focused light beam 281 is determined by the path from a first point at which light from the light projector 10 strikes the object to a second point through the center of the entrance pupil of the lens 276. In an embodiment, the aperture 291 is further aligned to the path that extends from the first point to the second point and into the optical detector assembly 295. Furthermore, in an embodiment, the position of the aperture 291 as adjusted in the z direction to cause the beam waist of the returning beam of light to pass through the aperture 291 when the object is in the range of 5 to 7 meters from the light projector 10. In an embodiment, the aperture 291 is large enough to pass nearly all of the return light through the exit aperture 251B onto the active area of the optical detector at the range of 5 to 7 meters. In an embodiment, the light begins to clip slightly at larger distances such as 10 to 15 meters from the light projector 10. At distances closer to the light projector 10 than 5 meters, the light may clip more significantly, but this is not usually a problem because the optical power scattered off an object point closer than 5 meters has larger scattered intensity than light scattered off an object point farther from the light projector 10.

In an embodiment, the aperture 291 is rigidly affixed to the aperture assembly 290, which in turn is rigidly affixed to the optical detector assembly 295. In an embodiment, the optical detector assembly 295 and aperture assembly 290 are further aligned to ensure that returning light passing through the center of the entrance pupil of the lens 276 not only passes through the center of aperture 291 but also the center of the active area of the optical detector in the optical detector assembly 295. As a result, the range of operation of the light projector 10 is made as large as possible. This is to say that the rigid attachment of the aperture 291 to the photodetector assembly 295 in combination with alignment of the aperture 291, the photodetector assembly 295, the lens 276, and the exit aperture 251B helps to ensure that the best sensitivity is obtained for objects both near to and far from the light projector 10. With this alignment, the pre-scan is also expected to give consistent results in determining the PMT gain settings required for each combination of object distance and object reflectance.

FIG. 3 is a perspective view of the electrical assembly 300 within the light projector 10, and FIG. 4 is an electrical block diagram for the light projector 10. The electrical assembly 300 includes an electronics plate 302 and a number of circuit boards including a carrier board 310, first galvo driver 320A, second galvo driver 320B, analog circuit 340, multi-voltage power supply 350, +24 volt power supply 360A, and −24 volt power supply 360B. The circuit block diagram representation for the electrical assembly 300 is shown in FIG. 4. The carrier board 310 includes a processor 312 that controls many functions within the light projector 10. Control cables 322A, 322B run from the carrier board 310 to digital-to-analog converters (DACs) 324A, 324B on the first and second galvo driver boards 320A, 320B, respectively. Control signals sent from the carrier board 310 to the DACs 324A, 324B control the angles of the mirrors 261A, 261B, thereby controlling the direction to which the beam is steered. Power supplies 360A, 360B supply +24 volts, −24 volts, respectively, to the galvo drivers 320A, 320B, which in turn supply voltages to the galvo motor/position-sensing components 328 through cables 326A, 326B. In an embodiment, a jumper cable 232 is used to connect the first and second galvo driver boards 320A, 320B when synchronized steering is needed in two dimensions (such as X and Y directions).

The analog circuit board 340 includes an analog-to-digital converter (ADC) 341. The ADC 341 receives an analog electrical signal from the optical detector 295, which in an embodiment is a PMT. The ADC 341 converts the analog signal into digital electrical signal, which it sends over an Ethernet cable 342 to the carrier board 310. The carrier board provides the digital data to the processor 312 and, in an embodiment, to an external computer attached to input/output (I/O) panel 370 through a USB cables 313, 314, an Ethernet cable 315, 316, and/or a wireless channel. In an embodiment, the processor 312 or external computer 420 constructs a gray-scale image of the optical powers received by optical detector 295. This image is sometimes referred to as an intensity image. Such an intensity image may be displayed to a user, may be used to identify features in the scanned object, and may be used for other functions such as setting the position of the focusing lens 241 with the motorized focusing stage 243. In an embodiment, the analog circuit board 340 receives voltages over the cable 343 from the multi-voltage power supply 350. In an embodiment, the carrier board 310 further provides control signals to the motorized focusing stage 243 over the cable 317 and control signals to the light source 212 over the cable 318. A connector 316 is attached to the circuit board to override the laser bypass circuit. In an embodiment, the carrier board 310 is further provided with a cable 319 operable to send a signal to reset the software on the carrier board. The carrier board 310 receives voltages over the cable 311 from the multi-voltage power supply 350. In an embodiment, additional voltages are provided from the multi-voltage power supply 350 to the I/O panel 370 and to the fan assembly 380.

In one or more embodiments, the light projector 10 includes a display 297 that includes a user interface that is operable to display the acquired intensity image and allow interaction with the user. In an embodiment, the display 297 may be integral with the housing 30. In another embodiment, the display 297 may be remote from the light projector 10. The display 297 may be coupled to the processor 312 via wired (e.g. Universal Serial Bus, Ethernet, etc.) or via a wireless (e.g. IEEE 802.11, Wi-Fi, Bluetooth™, etc.) communications mediums. In an embodiment, the light projector 10 may include a communications module 298 (FIG. 4) that is configured to transmit and receive signals from the processor 312, the display 297, and/or one or more remotely located computers. In an embodiment, the display 297 is a mobile computing device, such as a laptop or a tablet computer that is coupled for communication with the light projector 10 via the communications module 298.

In an embodiment, the communications module may include an IEEE 802.11 (i.e. Wi-Fi) compatible transceiver. The transceiver is configured to emit a signal in the IEEE 802.11 spectrum upon startup of the light projector 10. In this embodiment, the display 297 (or the computing device to which it is attached) may detect the signal and establish communications in accordance with the IEEE 802.11 protocol directly with the light projector 10. It should be appreciated that this provides advantages in environments where there may be no IEEE 802.11 infrastructure or network in place.

In embodiments where the environment where the light projector 10 is to be used has an IEEE 802.11 network available, the display 297 (or the computing device to which it is attached) may connect to the light projector 10 via the network. In an embodiment, the communications module 298 includes an IEEE 802.3 (i.e. Ethernet) communications port. The light projector 10 connects to the IEEE 802.3 network and the display 298 connects to the IEEE 802.11 network. The network created by the IEEE 802.3 and IEEE 802.11 networks provides a communication path between the display 297 and the light projector 10. It should be appreciated that this provides advantages in allowing for a remote connection (e.g. the display 297 is remote from the light projector 10) or in connecting the display 297 to multiple light projectors 10. In an embodiment, both the light projector 10 and the display 297 connect for communication via the IEEE 802.11 network.

In an embodiment, the light projector 10 includes an inertial measurement unit 299 (IMU) that includes sensors, such as accelerometers, compasses, or gyroscopes for example, that allow for an estimation of translational and rotational movement of the light projector 10. As discussed in more detail herein, the IMU 299 provides additional information that in some embodiments may be used to align the light projector 10 with an electronic model.

In an embodiment, the light projector 10 may be the same as that described in commonly owned and concurrently filed United States Provisional Application entitled "Laser Projector" (U.S. patent application Ser. No. 17/028,398), the contents of which are incorporated by reference herein.

It should be appreciated that in order for the image or template to be projected in the desired location, and in the desired pose, the position and orientation/pose of the light projector 10 in the environment needs to be registered to the model of the environment (e.g. CAD model, As-built CAD model, point cloud). In this way, the processor 312 can determine the vectors for emitting light along a path on a surface in the environment to form the image or template.

Figure 6:
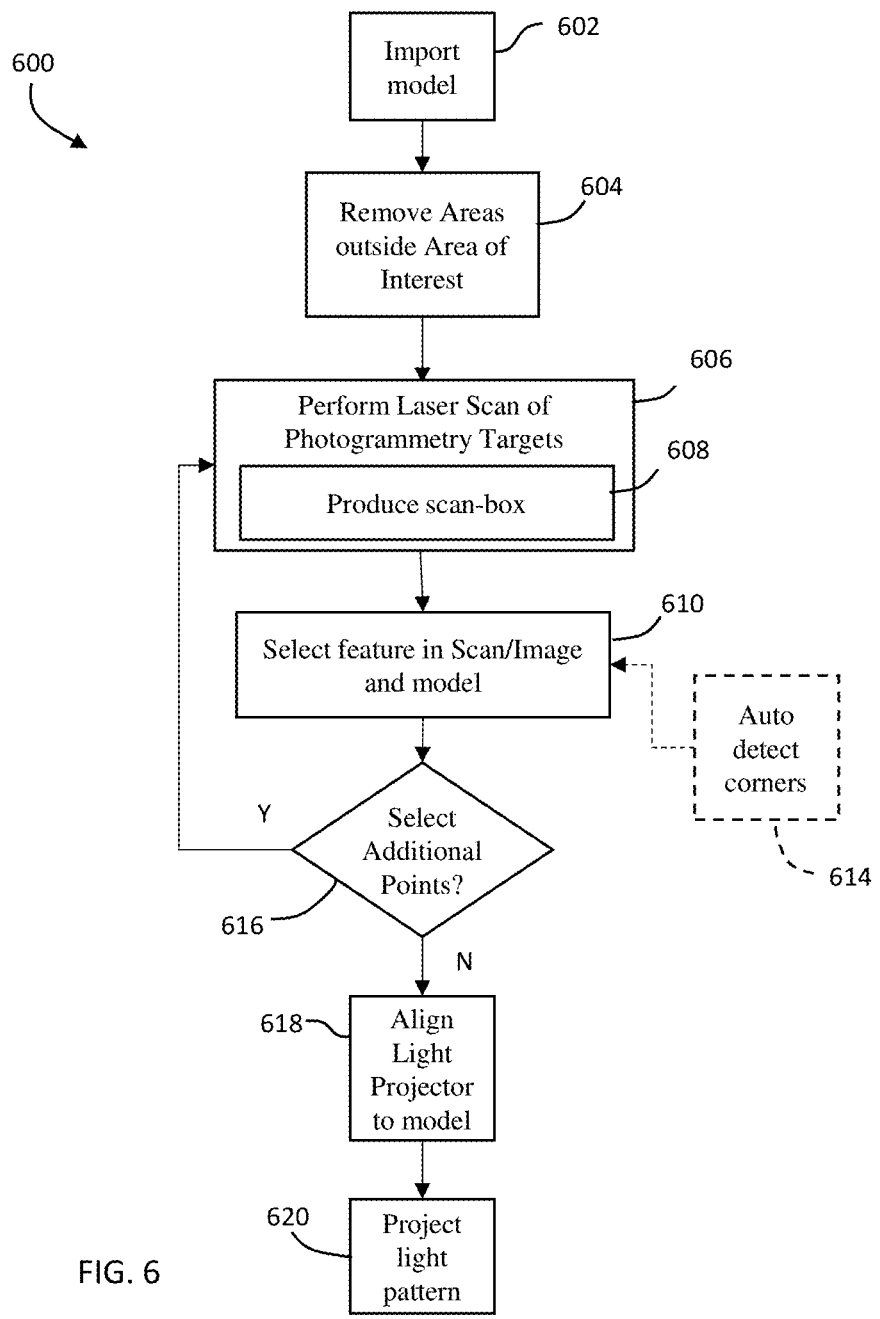
FIG. 6 is a flow diagram illustrating a method of aligning the light projector of FIG. 1 in accordance with an embodiment.

Referring now to FIG. 6, an embodiment of a method 600 is shown for registering or aligning the light projector 10 to the electronic model of the environment. The method 600 begins when the electronic model is imported, at block 602. In the illustrated embodiment, the electronic model is imported into, or is available to the processor 312. In other embodiments, the electronic model may be imported into a computing device remote from the light projector 10. In still other embodiments, the electronic model is imported into the computing device associated with display 297.

The method 600 then proceeds to block 604 for removing portions of the electronic model that are not relevant to the area where a pattern of light ("template") is to be projected. It should be appreciated that an electronic model, such as a computer-aided-design (CAD) model of a building for example, will have more data than the area where the pattern of light is to be projected. In some embodiments, the operator may clip, trim, or delete portions of the electronic model. In some embodiments, by removing portions of the electronic model, the performance of the computing device may be improved.

The method 600 further uses the light projector 10 to scan an intensity image containing the entire area of the electronic model that the light projector 10 is being aligned to. Parameters for the intensity image, such as field of view, scan speed, and scan resolution may be determined by a user or automatically determined by the light projector 10. To scan the intensity image, the light projector 10 performs a scan over its field of view (e.g. FIG. 5B) as described herein, at block 606. In some embodiments, the light projector 10 performs multiple scans.

In an embodiment, the light projector 10 projects a scan-box, which represents a portion of the light projector's 10 field of view that will be scanned to generate the intensity image, at block 608. The scan-box is visible to the operator. In some embodiments, the operator may place point targets, e.g., reflective targets, contrast targets (e.g. black and white checkerboard), coded targets, spheres that are detectable using the light projector, retroreflective targets, photogrammetry targets, and other types of detectable targets in the environment within the field of view of the light projector 10. The scan-box is produced using a predetermined set of parameters to generate a visible pattern of light to mark a particular area (representing the field of view) in which the operator can place the point targets to perform alignment of the light projector 10 with the 3D model (and environment). The parameters of the light projector 10 are adjusted dynamically to perform the alignment.

Figure 7:
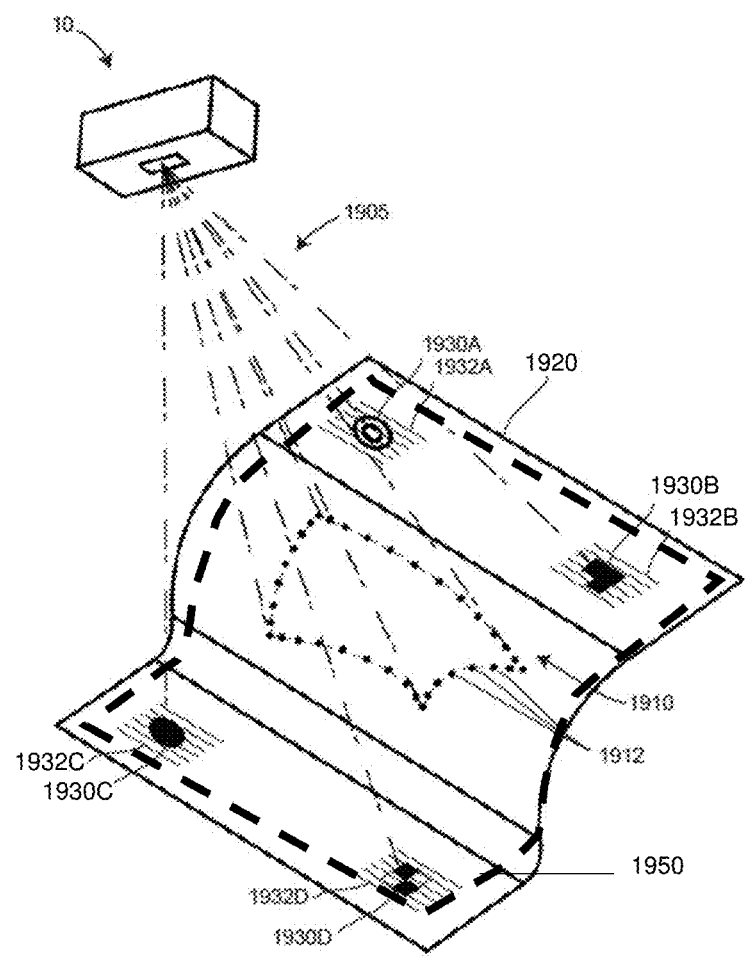
FIG. 7 is a schematic representation of a light projection system projecting patterns of light onto an object according to an embodiment.

In FIG. 7, the light projector 10 projects a glowing pattern of light 1910 that is included in the scan-box 1950 in the environment. The scan-box 1950 can encompass an object 1920 (e.g., 3D model) in some examples. It can be appreciated that although a single object 1920 is depicted, in other embodiments, the environment can include multiple objects 1920 on which the glowing pattern of light 1910 is incident. In some examples, the scan-box 1950 encompasses all the objects on which the glowing pattern of light 1910 is incident. The object 1920 is the 3D model in some embodiments. Alternatively, or in addition, the model 1920 can include one or more point targets that are used to align the light projector 10.

The glowing pattern of light 1910 is sometimes referred to as a "template." In general, the projected pattern of light 1910 is repeated periodically at a predetermined time interval, which is the period of the projected pattern. The reciprocal of the period of the projected pattern is called the refresh rate. If the refresh rate is too low, the glowing pattern will appear to observers to be flickering and will appear to flash at regular intervals. A flickering pattern can cause observers to experience fatigue, dizziness, and headaches. To avoid this problem, the refresh rate is set high enough that a viewer, e.g., the operator, observes the glowing pattern of light 1910 as a steady, flicker-free image. Such a flicker-free image is related to persistence of vision experienced when viewing motion pictures in cinema or on television. In some embodiments, it is also desired that the projected glowing pattern of light 1910 be bright enough to be clearly visible to an observer. At the same time, it is desired that a glowing pattern of light 1910 meet the eye safety limit for laser light.

The light projector 10 is used to scan point targets, (e.g., fiducial targets) such as the targets 1930A, 1930B, 1930C, 1930D with the same beam 1905 used to produce the glowing pattern of light 1910. In some cases, the point targets are made of retroreflective materials, while in other cases the point targets are features that are reflective but not retroreflective.

In an embodiment, the glowing pattern of light 1910 includes dotted contours 1912 as in FIG. 7. In an embodiment, the dots 1912 appear to be stationary to the human eye though the projected trajectory is created by dynamically steering the laser beam as a periodic function of time. In an embodiment, the dots 1912 are formed by pulsed laser light having a selectable repetition rate. A beam steering control produces variable acceleration and velocity through a stream of incremental position commands precisely synchronized with the timing of the laser pulses. The frequency and duration of the laser pulses are selected based at least in part on a selected beam angular velocity that maintains a reasonable separation between the dots while maintaining a peak optical power that meets the laser eye safety limits to implement such a collection of dots with the light projection system 10. In an embodiment, the light source 212 has modes for generating both pulsed light and continuous wave (cw) light. In an embodiment, the pulsed laser light may rapidly change repetition rate, peak power, and pulse duration. In an embodiment, the cw laser has a variable power level. In an embodiment, the light source 212 is a semiconductor laser having analog functionality for modulating the laser beam in time. In an embodiment, the light projector 10 ordinarily uses the pulsed mode of operation when projecting the glowing pattern of light 1910 on the object as a collection of dots 1912. The light projector 10 ordinarily uses the cw mode of operation when scanning the point targets and features such as 1930A, 1930B, 1930C, 1930D in raster scan patterns 1932A, 1932B, 1932C, 1932D, respectively. In an embodiment, the detected signal is converted from analog to digital form before sending it to the processor 312 for further processing. In an embodiment, the light projector 10 monitors the power of the beam 1905 to guarantee fail-safe system operation in multiple laser control modes by limiting the average output power and, if desired, the laser pulse energy according to the assigned laser safety class.

Figure 8:
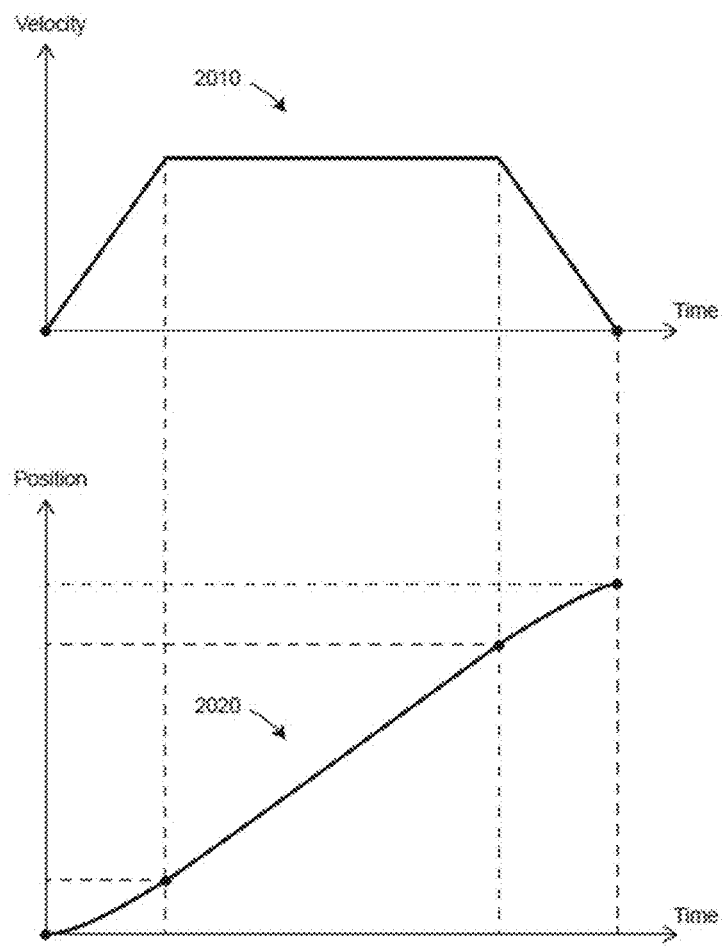
FIG. 8 is an exemplary pair of plots showing a trapezoidal velocity profile and resulting position profile according to an embodiment.
Figure 9:
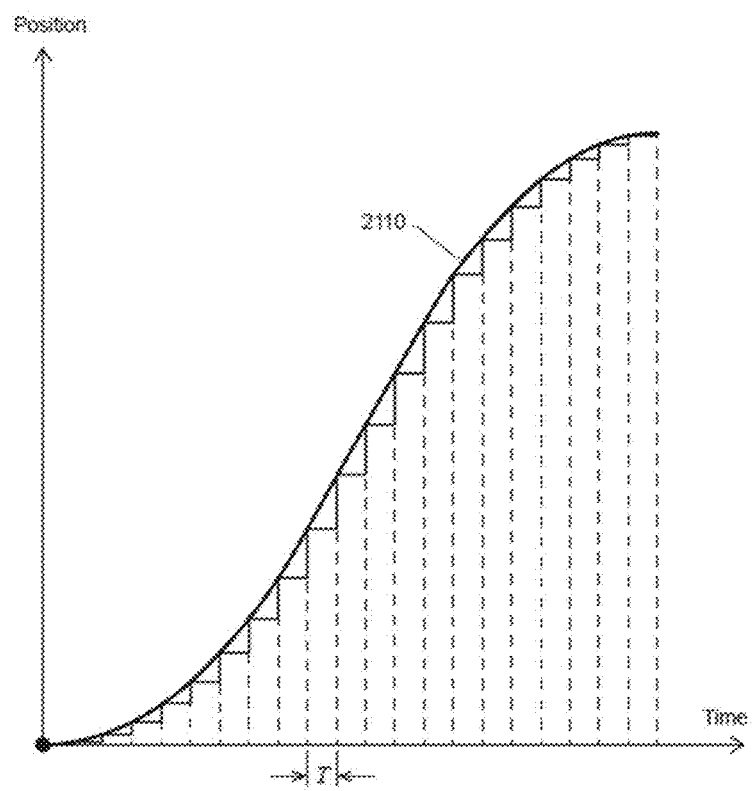
FIG. 9 is an exemplary plot showing beam steering trajectory control using free running motion control ticks according to an embodiment.

In an exemplary light projector 10, the beam steering angular velocity reaches up to about 200 radians per second, with beam steering angular accelerations reaching up to about 200,000 radians per second squared. FIG. 8 illustrates an exemplary velocity trajectory 2010 constructed of piecewise segments. FIG. 8 also shows the resulting position trajectory 2020, which is found by integrating the velocity trajectory over time. In an embodiment, beam-steering servo control is provided by the galvo module 328. In an embodiment, the galvo motor assemblies 320A use real-time position commands at equal time intervals ("time ticks") of between 10 and 80 microseconds. Because the time intervals are much smaller than the reaction time of the galvo motor assemblies 320A, the position commands executed in each time interval produce a smooth motion. This is illustrated in FIG. 9, where incremental position movements at time intervals T produce a smooth position trajectory 2110.

Figure 10:
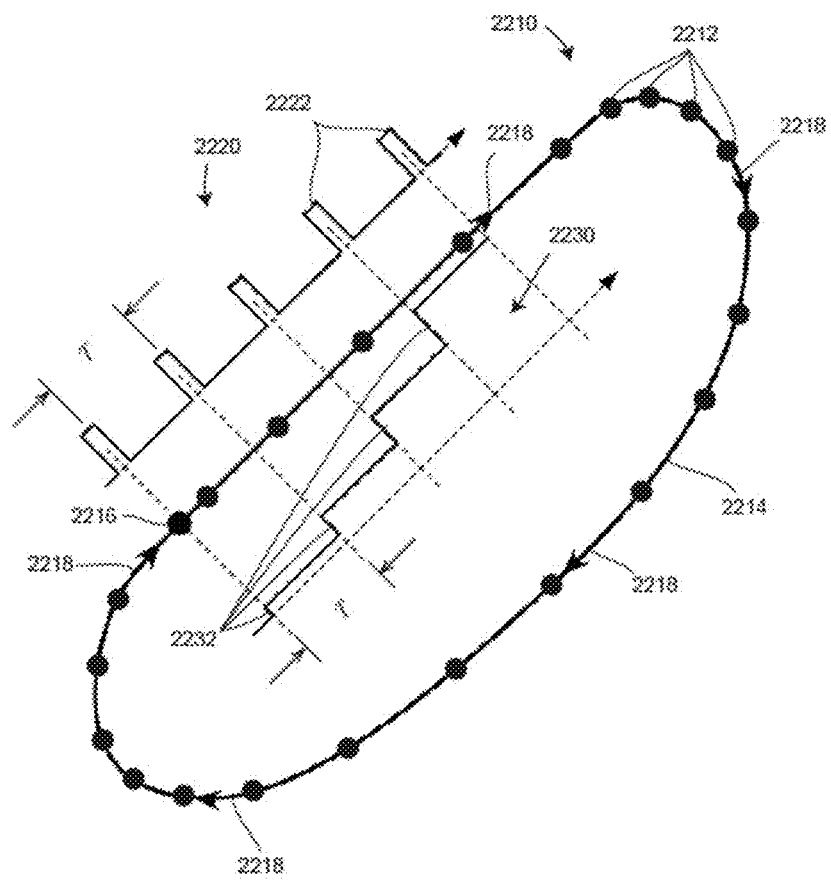
FIG. 10 is an exemplary projection pattern in which beam steering motion is synchronized with a stream of laser pulses according to an embodiment.

In an embodiment, the carrier 310 provides a master clock that sends synchronization signals to the galvo module 328 and to the light source 212. FIG. 10 is a schematic illustration showing how galvo movements and laser emissions are synchronized to produce a glowing pattern 2210.

The scan-box 1950 is projected at the start of a scanning procedure. The operator may adjust the size and position of the scan-box 1950 via a user interface, for example, with a mouse, touchscreen, keyboard, etc. The scan-box 1950 is adjusted to encompass targets such as 1930A, 1930B, 1930C, 1930C, 1930D. A "quick scan" is performed at a relatively low resolution over the entire scan-box 1950, which enables identifying the targets 1930A, 1930B, 1930C, 1930C, 1930D, although not necessarily the precise location of the targets 1930A, 1930B, 1930C, 1930C, 1930D. Following this initial quick scan, a higher-resolution raster scan of the targets 1932A, 1932B, 1932C, 1932D are performed. Light reflected off the scanned object are picked up by the galvanometer mirrors 261A, 261B and directed to an optical detector within the optical detector assembly 295. The intensity of the light reflected by the targets 1930A, 1930B, 1930C, 1930C, 1930D is picked up by the optical detector, which enables a processor within the device to determine the center of each of the targets as given by the steering angles of the galvanometer mirrors 261A, 261B. These angles to the centers of each of the targets 1930A, 1930B, 1930C, 1930C, 1930D are used by a processor in the system to determine the position and orientation of the scanned object within the frame of reference of the light projector 10. This facilitates associating the targets 1930A, 1930B, 1930C, 1930C, 1930D with corresponding points in the electronic model. Following this step, the template 1910 is then projected as glowing pattern of light on the object. The template 1910 is projected separately, and at a later time than the scan-box 1950. In an embodiment, the glowing template pattern 2210 is projected as a correction of dots 1912, although the individual dots may seem to form a continuous line because of the persistence of human vision at flashing rates above around 30 Hz. Accordingly, embodiments of the technical solutions herein facilitate one or more scan-boxes 1950 to be projected on the object to identify the regions to be scanned for targets 1930A, 1930B, 1930C, 1930C, 1930D. The light projector 10 then scans each of the targets to determine the angles to each target, enabling the position and orientation of the object 1920 to be found in the frame of reference of the light projector 10. In a separate step, the glowing pattern 1910 is projected in a desired position on the object.

The glowing pattern 2210 includes a collection of glowing dots 2212. A line 2214 connecting the dots is ordinarily not visible on the object. In an embodiment, a complete collection of the dots 2212 is projected once each cycle beginning with an initial projection point 2216. In an embodiment, both galvo mirrors 261A, 261B are completely settled in their positions at the initial projection point 2216. The direction of movement of the projected dots during a cycle is indicated by the arrows 2218. Clock pulses 2222 of the master clock pulse train 2220 are separated by the time intervals (time ticks) T. In an embodiment, the laser beam is emitted at each time interval, with one of the dots 2212 produced with each emission. In an embodiment, the amount of separation between adjacent dots 2212 is determined by the movement of the galvo mirrors 261A, 261B between light emissions. In an embodiment, this movement is determined by signals sent from the processor 312 to the galvo module 328. These signals are indicative of a position trajectory 2230 in FIG. 10, also discussed herein in reference to FIG. 9. The distance between successive dots 2212 are command increment distances 2232 calculated for each interval. Because of the dynamic integration of small individual command increments resulting in a smooth, reproducible motion profile, the locations of the laser dots 2212 appear stationary to the human eye, even though the trajectory path is created by a moving pulsed laser beam. Although in the discussion herein, the laser pulses were synchronized to command increment distances between dots 2212, a stationary pattern would still be created even if the time between laser pulses were a little different than the time between calculated position increments as long as the galvo mirrors 261A, 261B came to a stop at the start of each period at the projection point 2216 beam position.

Figure 11A:
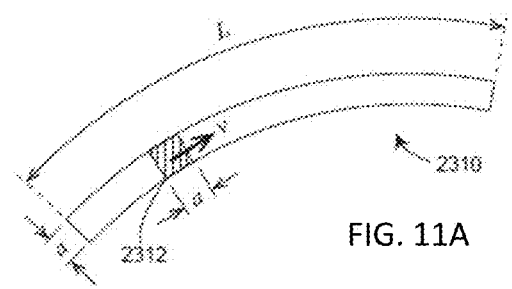
FIG. 11A is a schematic illustration of brightness of a projected laser line for a continuous wave (cw) laser beam according to an embodiment.
Figure 11B:
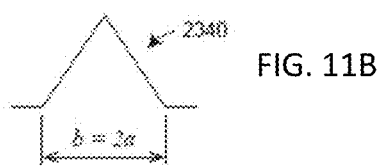
FIG. 11B is a schematic illustration of illumination distribution for a pulsed beam traveling at a constant velocity according to an embodiment.

Visibility of a glowing pattern 2210 formed by a focused moving light beam, either continuous or pulsed, is determined by its local average irradiance, in units of optical power per unit area, along the trajectory path. This is illustrated in FIG. 11A for continuous laser operation and in FIGS. 11B, 11C, 11D for pulsed operation. To simplify calculations, the shape of the focused laser spot 2312 in FIG. 11A is a square, each side having a dimension a. For the case of cw laser operation that produces a periodically projected continuous glowing line section 2310 formed by a continuously moving laser spot 2312 having a linear velocity v, a projection refresh period T, a spot side dimension a, and a cw beam power $P_0$, the average irradiance $A_0$ of the glowing line section as seen by a viewer is $$A_0 = (P_0/a^2)(a/L) = P_0/(vTa) \qquad \text{(Eq. 1)}$$

Here, the length L of the periodically projected line 2310 is $L = v \cdot T$. For the case of continuous laser operation, the average output power $P_A$ is equal to the cw laser power $P_0$.

Figure 11C:
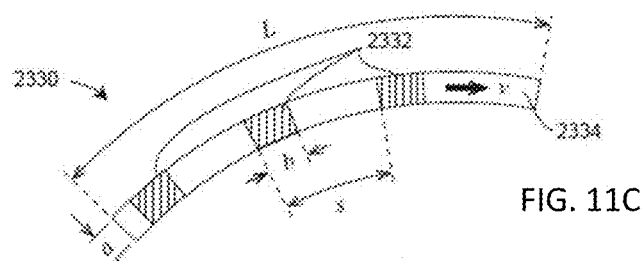
FIG. 11C is a schematic illustration of brightness of a projected laser line for a pulsed laser beam according to an embodiment.
Figure 11D:
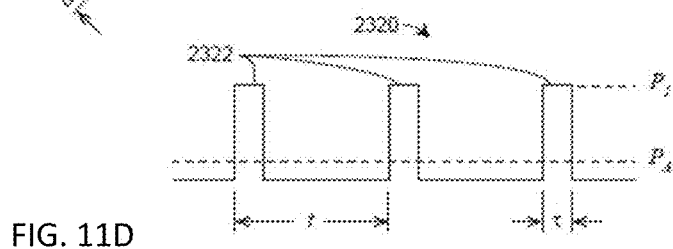
FIG. 11D is a schematic illustration of laser pulses according to an embodiment.

FIG. 11D shows a pulse train 2320 of individual laser pulses 2322 each having a pulse width $\tau$, the time interval between pulses t, and a peak power $P_1$. The average output beam power $P_A$ of the pulse train 2320 is $$P_A = P_1 \tau / t. \qquad \text{(Eq. 2)}$$

FIG. 11C shows a periodically projected pattern 2330 having isolated areas 2332 illuminated during the laser pulses 2322. The projected spots are blurred over the pulse width r by the movement of the beam at the linear velocity v. If the velocity is constant over the pulse width, then the velocity is equal to $$v = a/\tau, \qquad \text{(Eq. 3)}$$

And the illumination distribution across each area 2332 has a triangular shape 2340 that occupies a length $$b = 2a \qquad \text{(Eq. 4)}$$

If the pulses are synchronized with the beam motion control as described herein above, the isolated areas 2332 appear to be stationary to the human eye, and the isolated areas 2332 occupy the same locations in the path 2334 for every period of projection. In this situation, the separation s between adjacent areas 2332 is $$s = t \cdot v. \qquad \text{(Eq. 5)}$$

The average irradiance $A_1$ of a single laser dot in an isolated area 2332 as it appears to a viewer eye is $$A_1 = (P_1/2a^2)(a/L). \quad \text{(Eq. 6)}$$

Noting that for the case of a cw laser beam, the average output power is equal to the cw laser power, $P_A = P_0$, and combining Eqs. (1)-(6) give the results $$A_1 = A_0 s/b, \quad \text{(Eq. 7)}$$

$$\text{and } s/b = t/(2\tau). \quad \text{(Eq. 8)}$$

Eq. (7) says that average irradiance of an individual laser dot in area 2332 as viewed by an observer's eye is higher by a factor s/b than the average irradiance of a continuously moving laser spot 2312 emitted by a cw laser. Hence it is possible to improve visibility using a pulsed laser beam to produce dots that appear stationary to a user. As an example, to achieve an increase in the irradiance of 5 to 10 times in a glowing pattern of light seen by an observer, the ratio s/b would ordinarily be held to at least 10:1.

It is understood that the discussion above made some simplifying assumptions such as the shape of the moving laser spot (square rather than Gaussian shape, for example). In some embodiments, more detailed calculations are performed to eliminate the simplifying assumptions. In general, the effective spot size is a function of pulse width, linear velocity, and simplified spot size: $b = F(\tau, v, a)$.

An aspect of an embodiment is obtaining high visibility of the dots that appear stationary while keeping within laser safety requirements so that the scan-box 1950 can be projected in the environment for the operator to adjust the light projector 10 (or the point targets) to ensure alignment with the 3D model. This is done by adjusting a combination of parameters, including average laser power, pulse repetition rate, instant pulse energy, focused laser spot size, distance between the light projector 10 and the object, and the beam steering angular velocity.

In an embodiment, the relevant laser safety standard in most cases is the International Standard on Safety of Laser Products IEC 60825-1. This standard defines Accessible Exposure Limits (AEL) by limiting the average laser power, the single pulse energy, and the energy per pulse within a pulse train for each defined Laser Safety Class. In other embodiments, other standards or safety guidelines are followed instead of, or in addition to, those of IEC 60825-1.

For galvanometer-based laser light projectors such as the light projector 10, usually the relevant laser quantities from IEC 60825-1 are average laser power and single pulse energy. Allowable levels for these quantities are established for different laser classes. For the light projector 10, usually projectors are either class 2 or class 3R. For projection of visible wavelengths, the average optical power limits are 1 mW for class 2 and 5 mW for class 3R.

According to the 2014 edition of IEC 60825-1, the maximum single pulse energy for visible light pulses shorter than 5 microseconds is 77 nJ (nanojoules) for class 1 and class 2 and 380 nJ for class 3R.

For a single pulse energy $E_P$ and an average power $P_A$ of a pulse train, the periodicity of pulses is given by $$t = E_P/P_A. \quad \text{(Eq. 9)}$$

Hence for a class 2 laser at the optical power limit of 1 mW and a pulse energy limit of 77 nJ, the periodicity of laser pulses in a pulse train must be separated by at least H=77 nJ/1 mW=77 µs. In this document, the symbol H is used to represent the maximum allowable periodicity. Many values are possible for the allowable periodicity H according to the standard being considered.

For pulsed laser operation, a value is obtained for a maximum allowable linear spacing between projected dots. Spacing between the dots must be small enough to provide an operator with guidance to align and place items in a manufacturing or construction projector. In an embodiment, the spacing s is a constant. The light projector 10 has maximum achievable angular velocity $v_{ang}$ (in units of radians per second) for the projected beam of light. In an embodiment, the periodicity t between pulses is determined with the equation $t = s/(D \cdot v_{ANG})$. In one embodiment, D is the average distance between the light projector 10 and the object. Under this condition, the quantities s, D, and $v_{ang}$ are fixed so that the periodicity t between adjacent laser pulses is also fixed. In another embodiment, the distance D is taken to be the actual distance to each point, which then produces a periodicity t that changes with the distance D.

In an action, one of two branches is taken according to whether the periodicity t between pulses is less than or equal to the pulse train periodicity threshold H. If $t \leq H$, then for an allowable average power limit $P_{AvLim}$ and a maximum available peak laser power $P_{PkMax}$, the pulse width $\tau$ and peak power $P_1$ are set to $$\tau = t \cdot P_{AvLim}/P_{AvLim}/P_{PkMax}, \quad \text{(Eq. 10)}$$

$$P_1 = P_{PkMax}. \quad \text{(Eq. 11)}$$

If $t > H$, then the pulse width $\tau$ and peak power $P_1$ are set to $$\tau = (t/0.7)^{1.33}, \quad \text{(Eq. 12)}$$

$$P_1 = P_{AvLim}. \quad \text{(Eq. 13)}$$

The calculated values for the periodicity t, the pulse width r, and the peak pulse power $P_1$ are selected to provide control of the laser when running in pulsed mode. The laser beam is steered by the galvo steering mirrors 261A, 261B in response to signals sent from the processor 312. The trajectory produced by the galvo steering mirrors 261A, 261B is synchronized to the laser pulses.

For cw laser operation, the processor calculates the trajectory of the glowing pattern. The average output power is set less than or equal to the laser safety limit: $P_{Av} \leq P_{AvLim}$. The galvo steering mirrors 261A, 261B move the laser beam along a predetermined trajectory, taking steps with free running motion control ticks T as in FIG. 9.

Referring back to the flowchart in FIG. 6, the operator changes the pose of the light projector 10 to ensure that the scan-box 1950 that is projected by the light projector 10 encompasses all the point targets to be used for the alignment. Changing the pose can include translating, and/or rotating the light projector 10, the movement being along any axis (X, Y, Z). The scan-box 1950 can encompass the entire field of view of the light projector 10 in some embodiments. Alternatively, the scan-box 1950 can be of predetermined dimensions to only encompass a portion, and not the entire field of view of the light projector 10. For example, the predetermined scan-box 1950 can be a square with each side being of prescribed dimensions (5 centimeters, 10 centimeters, etc.), with the square projected at a predetermined distance (5 centimeters, 10 centimeters, etc.) from the light projector 10. In other embodiments, one or more of the sides of the scan-box 1950 can have different dimensions from the rest of the sides. The scan-box 1950 can be a square, a triangle, a circle, a trapezoid, or any other shape. The scan-box 1950 can be three-dimensional in some cases. It is understood that above mentioned dimensions are examples, and that one or more embodiments can use various other dimensions. The operating parameters (described herein) of the light projector 10 are adjusted accordingly to project the predetermined scan-box 1950.

In one or more embodiments of the present invention, the operating parameters (e.g., τ, V, a, $P_1$, etc.) are adjusted dynamically by the operator to generate a predetermined scan-box 1950. The adjustments can be made to configure the projection of the scan-box 1950, for example, to reduce flicker, adjust dimensions of the projected light 1910, adjust gain, adjust resolution, adjust scan pattern, etc. For example, an operator can interact with a computer system to adjust the scan-box 1950, where the computer system is in communication with the laser projector 10. For example, a left-click of a mouse of the computer system can be used to move the scan-box 1950, and a right-click can be used to change the size of the scan-box 1950. It is understood that other user-interactions can be used for such adjustments, and that additional/different adjustments can be made in other examples.

Alternatively, or in addition, the operator can move the point targets to ensure that at least the prescribed number of point targets are within the scan-box 1950. In some embodiments, the point targets are placed at predetermined positions in the scan-box 1950. The 3D model can provide the predetermined positions where the point targets are to be placed in the scan-box 1950. The 3D model is predefined and viewable to the operator, for example, as an electronic media (image, documents, etc.) or non-electronic media (e.g., printed copy).

Once the intensity scan is performed to capture the information in the scan-box 1950 in the form of the intensity image is acquired, the process proceeds to block 610. In block 610, the intensity image is displayed on the display 297. In the display 297, the operator selects a feature in the intensity image of the environment, such as a corner of a wall (natural feature) or a point target (artificial feature), for example. The operator then selects the same feature in the electronic model to define or associate that the features selected in the intensity image represent the same point in space. The point target can be selected via the external computer 420 in some embodiments. For example, the 3D model is displayed by the external computer 420, where the operator can interact with the model to perform one or more selections.

It should be appreciated that in an embodiment using point targets, the reflected light from the target will be significantly brighter (e.g. higher optical power) than the surrounding area in the intensity map. In some embodiments, this allows the point target to be automatically identified and selected. The intensity image is processed to find the location of point targets. Point targets are any identifiable features that can be described by a single 2D and 3D point in space. Point targets may include a circular target, either retro-reflective or with contrasting brightness levels. Point targets may also be a flat checkerboard which can be retro-reflective or with contrasting brightness. Point targets may also be an intersection point of, such as three surfaces (floor and two walls, ceiling and two walls, etc.). Point targets may be of one type, or any combination of types. In an embodiment where the feature is a natural feature, it may be automatically detected in block 614 using a suitable image processing technique, such as but not limited to Canny, Solbel, Kayyali detectors or a Gaussian or Hessian type detector for example.

In one or more embodiments, each point target is measured in more detail. This is used to determine target location more accurately or remove targets that have been falsely identified.

The one or more point targets are then matched to the nominal 3D locations from the electronic model. As noted earlier, the nominal 3D locations are provided by the operator, for example, by selecting via a user interface. Alternatively, the nominal 3D locations are predetermined locations. In some embodiments, an estimated location of the projector may be used to reduce the search space of target matching. The estimated location of the projector may be provided by the electronic model, or by another external measurement. In some embodiments, there may be less or equal number of point targets than nominal 3D locations. In other embodiments, there may be more nominal 3D locations than the point targets that are detected. The point targets and the nominal 3D locations are named the smaller set and larger set determined by which set has more items. Each item in the smaller set is assumed to be able to match to an item in the larger set. A minimal number of items forming the largest polygon in the smaller set is selected. The number of items is determined by the least amount of points needed to align the projector.

For each N choose M permutations of the larger set, where N is the number of items in the larger set and M is the number of items in the polygon, an alignment is calculated between the items in the polygon and the items in the current iteration of the permutation. If an alignment can be calculated, an error metric is calculated from the point targets and nominal 3D locations using that alignment. The error metric for each possible alignment is recorded. The possible alignments are then ordered from least error metric to greatest. For each error metric, an alignment is calculated between the point targets and the nominal 3D locations. The first error metric that can calculate a successful alignment is determined to be the correct alignment and matching is complete.

The method 600 then proceeds to query block 616 where it is determined whether additional points in the environment/model are desired. In the illustrated embodiment, it is desired to have four or more points identified in the environment/model. In other embodiments, it is desired to have at least six points identified in the environment/model. When the query block 616 returns a positive, the method 600 loops back to block 606 and additional points are identified in the image and the model.

It should be appreciated that in some embodiments there may not be a sufficient number of natural features (e.g. corners) to obtain a desired level of alignment. In one embodiment, when fewer natural features than are desired are within the field of view, the operator may create an artificial point in space using a device such as a plumb bob, for example. The operator installs the plumb bob and measures using a tape measure from known locations to the point of the plumb bob. A corresponding point may then be added to the electronic model. In still other embodiments, an artifact having multiple retroreflective targets may be placed in the environment within the scan-box 1950.

It should be appreciated that there may be a difference between an electronic design-model that was generated as part of the original design, and an as-built model. The as-built model will be generally more accurate regarding the position/location of features. As a result, when a design-model is used, in some instances the alignment will deviate from a desired level of accuracy. In some embodiments, the movement or rotation data from the IMU 299 may be used to narrow the solution space so avoid or reduce the risk of an alignment that is incorrect. In other embodiments, one or more artifacts placed in the environment may provide an indication on whether the alignment is within desired accuracy parameters.

When the query block 616 returns a negative, meaning a sufficient number of features/points having been identified in the image and the model, the process 600 proceeds to block 618 where the light projector 10 and the electronic model are aligned using the features/points identified in block 610. With the light projector 10 and the electronic model aligned, the process 600 proceeds to block 620 where the path for emitting the light is determined and the pattern of light is projected onto a surface in the environment. In an embodiment, the features and points are aligned using a best fit methodology.

In some embodiments, during operation the alignment of the light projector 10 to the electronic model will change or move, this is sometimes referred to as "drift." Without being bound to any particular theory, it is believed that drift may be caused by galvanometers heating or from physical interaction between the light projector 10 and the operator (e.g. the light projector is accidentally bumped), or vibrations in the environment (e.g. on the surface the light projector is placed).

Figure 12:
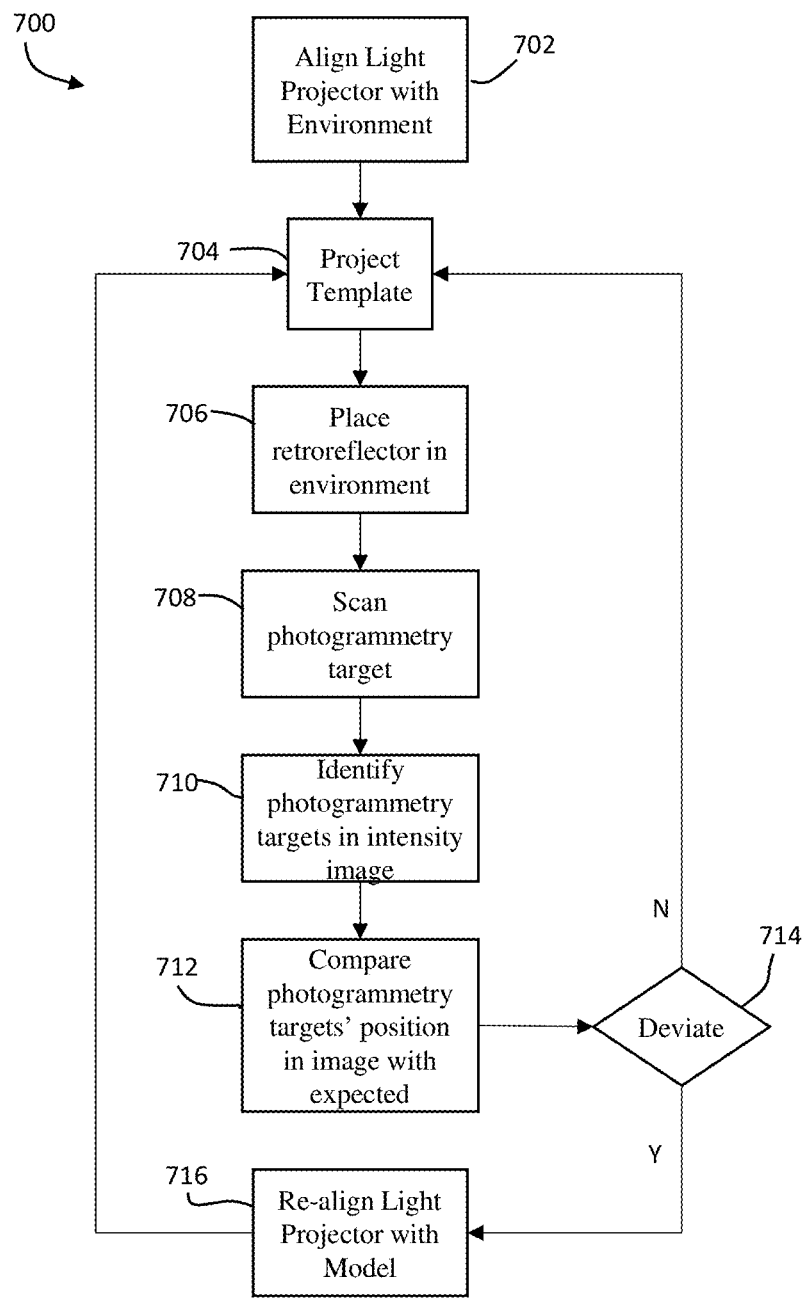
FIG. 12 is a flow diagram illustrating a method of checking for drift and realigning the laser projector of FIG. 1 in accordance with an embodiment.

Referring to FIG. 12, an embodiment of a method 700 is shown for performing a periodic drift check. The method 700 starts in block 702 with the light projector 10 and the electronic model being aligned, such as in the manner described with reference to FIG. 6. The method 700 then proceeds to block 704 where the template or image is projected onto a surface within the environment. Then on a periodic or aperiodic basis, or when requested by the operator, a drift check is performed. The method 700 proceeds to block 706 where one or more point targets are placed in the environment within the field of view of the light projector 10. The method then proceeds to block 708 where the intensity image of the one or more point targets are acquired.

With the intensity image acquired, the method 700 proceeds to block 710 where the retroreflective targets are identified. The method 700 then compares in block 712 the positions of the point targets in the intensity image with the expected position of the of the point targets. The method 700 proceeds to block 714 where it is determined if the deviation in the imaged position from the expected position is more than a predetermined threshold. When the query block 714 returns a negative the method 700 loops back to block 704.

When the query block 714 returns a positive, the method 700 proceeds to block 716 where the light projector 10 is once again aligned with the electronic model, such as in the manner described herein above with respect to FIG. 6. With the light projector 10 and electronic model re-aligned, the method 700 loops back to block 704 to continue projecting the image or template.

Figure 13:
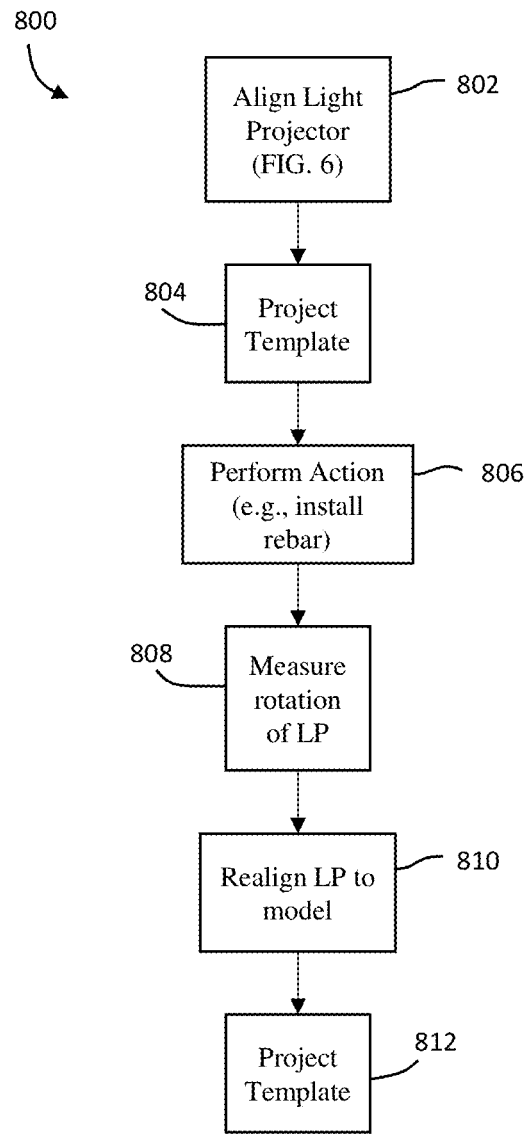
FIG. 13 is a flow diagram illustrating a method of changing an orientation of the light projector of FIG. 1 and realigning the light projector to the environment in accordance with an embodiment.

It should be appreciated that in some embodiments, the operator may desire to rotate the light projector 10 on the stand or tripod that it is mounted, such as to project a template that was outside the initial field of view, or to project a new template for example. Referring to FIG. 13, an embodiment is shown of a method 800 for rotating the light projector 10 and realigning the light projector 10 with the electronic model.

The method 800 starts in block 802 where the light projector is aligned to the electronic model, such as in the manner described in reference to FIG. 6 for example. The method 800 then proceeds to block 804 where the template is projected on to a surface in the environment and an action related to the template (e.g. install rebar cage, studwall layout, formwork position, opening position verification, class issue visualization) is performed in block 806.

The operator then rotates the light projector 10 on the stand or tripod and the amount of rotation is measured with the IMU 299, at block 808. In an embodiment, the operator uses the scan-box 1950 while rotating the light projector 10 to orient the light projector 10 in the desired direction. The method 800 then proceeds to block 810 where the light projector 10 is realigned with the electronic model based at least in part on the angle of rotation measured by the IMU 299. With the light projector 10 realigned, the method 800 proceeds to block 812 where the new template is projected onto a surface within the field of view of the light projector 10 in the rotated position.

Figure 14:
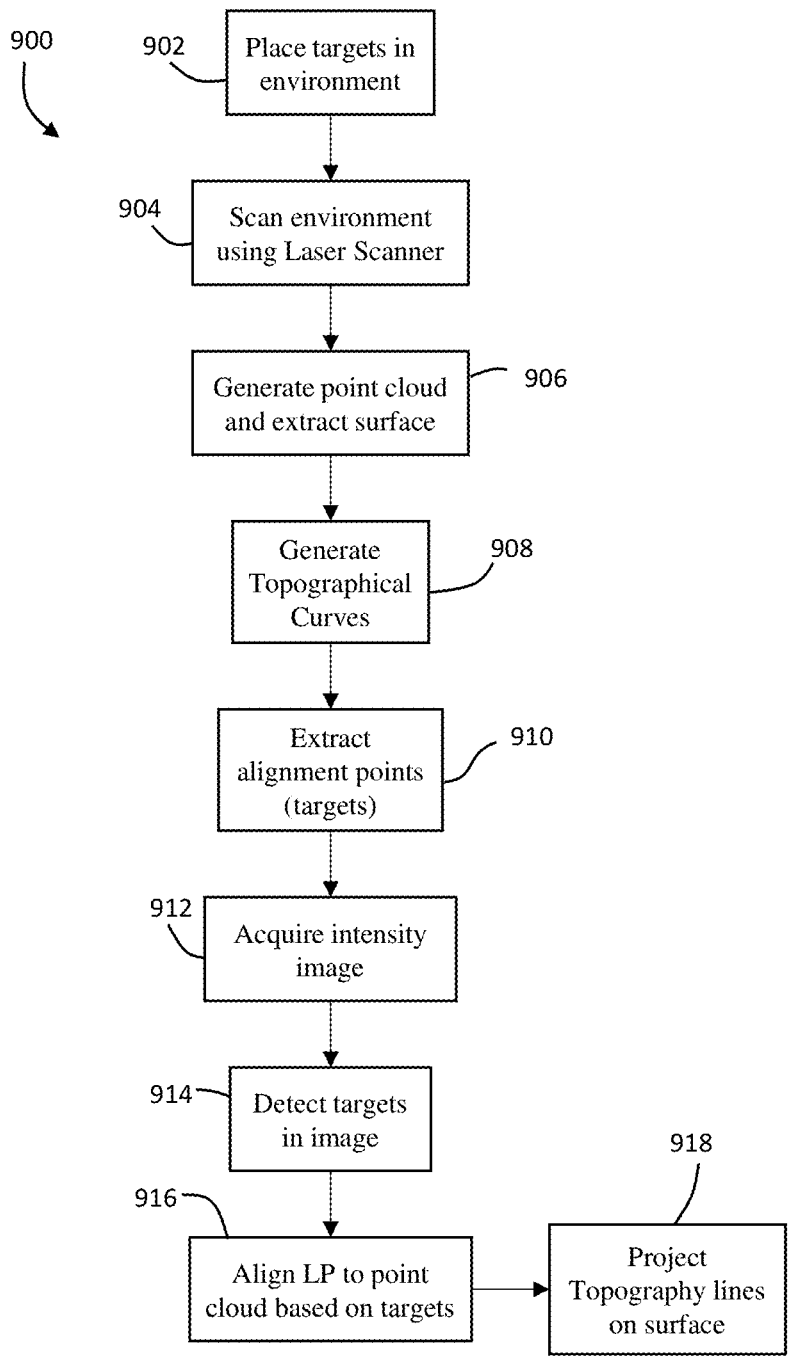
FIG. 14 is a flow diagram illustrating a method of aligning the light projector of FIG. 1 and emitting a topography line on a surface in accordance with an embodiment.

In some embodiments, it may be desirable to provide a visual indication of a floor or surface flatness. Referring now to FIG. 14, a method 900 is shown for measuring a flatness of a surface, generating topographical curves, and projecting the topographical curves onto the surface with the light projector 10. The method 900 starts in block 902 where point targets (e.g. checkerboard targets) are placed in the environment. The method 900 then proceeds to block 904 where the environment is scanned with a laser scanner to measure three-dimensional (3D) coordinates of surfaces in the environment. In the illustrated embodiment, the laser scanner may be the same as that described in commonly owned U.S. Pat. No. 9,074,883 entitled "Device for optically scanning and measuring an environment" the contents of which are incorporated by reference herein.

The output of the laser scanner is a plurality of three-dimensional coordinates that represent points on the surfaces in the environment. These coordinates may be graphically represented as points, that are commonly referred to as a "point cloud." The method generates the point cloud in block 906. From the point cloud, the user can identify and extract the surface to be analyzed (e.g. the floor). From this surface, topographical curves are generated in block 908. The curves may be based on a user defined resolution or zone size that defines the sampling distance on a grid. The user may further define the isometric height for the curves (e.g. 0.25 inches). In some embodiments, the user may also define a minimum island size that defines a size of the topographical contours.

The method 900 then proceeds to block 910 where the targets from block 902 are extracted as alignment points. The operator then acquires an intensity image of the environment, at block 912. One or more of the targets from block 902 are located within the intensity image by adjusting the visible scan-box 1950 as described herein. As noted, the scan-box 1950 represents the portion of the environment that will be captured in the intensity image. The method 900 then proceeds to block 914 where the targets are detected in the intensity image that is captured. Using the extracted alignment points from block 910 and the identified targets from block 914, the method 900 proceeds to block 916 where the light projector is aligned to the point cloud. The method 900 then proceeds to project a template based on the topographical curves of block 908 to provide a visual indication of the flatness of the surface.

It should be appreciated that while the embodiment of FIG. 14 refers to a floor, this is for exemplary purposes and the claims should not be so limited. In other embodiments, the surface being measured and projected onto may be a different surface, such as but not limited to a ceiling, a wall, or a column for example.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions, or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A method of aligning a light projector and an electronic model in an environment, the method comprising:
   placing the light projector in the environment;
   projecting a visible scan-box to mark a portion of the environment to be captured in an intensity image by the light projector;
   acquiring the intensity image of the portion of the environment at a predetermined scan resolution;
   identifying a plurality of point targets in the environment in the intensity image;
   associating the plurality of point targets with a plurality of points in the electronic model;
   aligning the light projector to the electronic model based at least in part on the plurality of point targets and the plurality of points;
   measuring an angle rotation of the light projector with at least one sensor; and
   realigning the light projector to the electronic model based at least in part on the measured angle of rotation.

2. The method of claim 1, wherein the intensity image is acquired by performing multiple intensity scans to refine locations of the point target.

3. The method of claim 1, wherein associating the plurality of point targets with the plurality of points includes automatically detecting with a processor the point targets in the intensity image.

4. The method of claim 1, further comprising checking on a periodic or aperiodic basis for drift, wherein the checking for drift includes placing at least one point target in the environment and acquiring a second intensity image of the at least one point target.

5. The method of claim 4, wherein the checking for drift further comprises identifying the at least one point target in the second intensity image and comparing a position of the at least one point target in the second intensity image with an expected position of the at least one point target.

6. The method of claim 5, wherein the checking for drift further comprises realigning the light projector and electronic model when a deviation between the position of the at least one point target in the second intensity image and the expected position exceeds a threshold.

7. The method of claim 1, further comprising:
   scanning the environment with a laser scanner to obtain a plurality of three-dimensional coordinates in the environment, a portion of the plurality of three-dimensional coordinates being on a surface;
   extracting the surface from the plurality of three-dimensional coordinates;
   generating at least two topographical curves based on a flatness of the surface; and
   projecting a light pattern on the surface with the light projector based at least in part on the at least two topographical curves.

8. The method of claim 7, further comprising projecting a glowing pattern of light onto the portion of the environment.

9. A system comprising:
   a light projector having a light source, a beam-steering system operable to direct a beam of outgoing light onto a surface, the light projector further having an optical detector configured to receive at least a portion of a light beam reflected off of the surface; and
   one or more processors that are operable to execute computer instructions to perform a method comprising:
      projecting a visible scan-box to mark a portion of an environment in which the light projector is placed, wherein the portion of the environment is captured in an intensity image by the light projector;
      acquiring the intensity image of the portion of the environment at a predetermined scan resolution;
      identifying a plurality of point targets in the environment in the intensity image;
      associating the plurality of point targets with a plurality of points in an electronic model including a representation of the portion of the environment;
      aligning the light projector to the electronic model based at least in part on the plurality of point targets and the plurality of points
      measuring an angle of rotation of the light projector; and
      realigning the light projector tot eh electronic model based at least in part on the angle of rotation, wherein the angle of rotation is measured by at least one sensor integral with the light projector.

10. The system of claim 9, wherein the one or more processors is further configured to perform a method comprising:
    acquiring on a periodic or aperiodic basis a second intensity image of the environment;
    identifying a retroreflective target in the second intensity image;
    comparing a position of the retroreflective target with an expected position; and
    realigning the light projector to the electronic model when a deviation between the position and the expected position exceeds a threshold.

11. The system of claim 9, wherein the at least one sensor is part of an inertial measurement unit that it integral with the light projector.

12. The system of claim 9, further comprising:
    a laser scanner having a second light source and a second optical detector, the laser scanner being configured to measure a plurality of three-dimensional coordinates in the environment;
    wherein the one or more processors is further configured to perform a method comprising:

causing the laser scanner to acquire the plurality of three-dimensional coordinates, a portion of the three-dimensional coordinates being on a surface;
extracting the surface from the plurality of three-dimensional coordinates;
generating at least two topographical curves based on a flatness of the surface; and
projecting a light pattern on the surface with the light projector based at least in part on the at least two topographical curves.

13. A computer program product comprising a memory device with computer executable instructions stored thereon, the computer executable instructions when executed by one or more processors causes the one or more processors to perform a method comprising:
projecting a visible scan-box to mark a portion of an environment in which the light projector is placed, wherein the portion of the environment is captured in an intensity image by the light projector;
acquiring the intensity image of the portion of the environment at a predetermined scan resolution;
identifying a plurality of point targets in the environment in the intensity image;
associating the plurality of point targets with a plurality of points in an electronic model including a representation of the portion of the environment;
aligning the light projector to the electronic model based at least in part on the plurality of point targets and the plurality of points;
measuring an angle of rotation of the light projector, and
realigning the light projector tot eh electronic model based at least in part on the angle of rotation,
wherein the angle of rotation is measured by at least one sensor integral with the light projector.

14. The computer program product of claim 13, wherein the one or more processors is further configured to perform a method comprising:
acquiring on a periodic or aperiodic basis a second intensity image of the environment;
identifying a retroreflective target in the second intensity image;
comparing a position of the retroreflective target with an expected position; and
realigning the light projector to the electronic model when a deviation between the position and the expected position exceeds a threshold.

15. The computer program product of claim 13, wherein the at least one sensor is part of an inertial measurement unit that it integral with the light projector.

16. The computer program product of claim 13, further comprising:
a laser scanner having a second light source and a second optical detector, the laser scanner being configured to measure a plurality of three-dimensional coordinates in the environment;
wherein the one or more processors is further configured to perform a method comprising:
causing the laser scanner to acquire the plurality of three-dimensional coordinates, a portion of the three-dimensional coordinates being on a surface;
extracting the surface from the plurality of three-dimensional coordinates;
generating at least two topographical curves based on a flatness of the surface; and
projecting a light pattern on the surface with the light projector based at least in part on the at least two topographical curves.

17. The computer program product of claim 13, wherein the scan-box is adjusted to encompass the plurality of point targets.

* * * * *